(12) United States Patent
Shemesh et al.

(10) Patent No.: US 12,217,079 B2
(45) Date of Patent: *Feb. 4, 2025

(54) DETECTING SECURITY EXCEPTIONS ACROSS MULTIPLE COMPUTE ENVIRONMENTS

(71) Applicant: Wiz, Inc., New York, NY (US)

(72) Inventors: Daniel Hershko Shemesh, Givat-Shmuel (IL); Yarin Miran, Rishon Lezion (IL); Roy Reznik, Tel Aviv (IL); Ami Luttwak, Binyamina (IL); Yinon Costica, Tel Aviv (IL); Raaz Herzberg, Tel Aviv (IL); Yaniv Joseph Oliver, Tel Aviv (IL); Osher Hazan, Mazkeret Batia (IL); Niv Roit Ben David, Tel Aviv (IL)

(73) Assignee: Wiz, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/400,705

(22) Filed: Dec. 29, 2023

(65) Prior Publication Data

US 2024/0168792 A1 May 23, 2024

Related U.S. Application Data

(63) Continuation-in-part of application No. 17/664,508, filed on May 23, 2022.

(51) Int. Cl.
*G06F 9/455* (2018.01)
*G06F 21/53* (2013.01)
*G06F 21/60* (2013.01)

(52) U.S. Cl.
CPC .. *G06F 9/45558* (2013.01); *G06F 2009/4557* (2013.01); *G06F 2009/45587* (2013.01)

(58) Field of Classification Search
CPC .................................................. H04L 63/1416
(Continued)

(56) References Cited

U.S. PATENT DOCUMENTS 6,910,132 B1  6/2005  Bhattacharya
7,627,652 B1  12/2009  Commons et al.
(Continued)

FOREIGN PATENT DOCUMENTS

EP   4160983 A1   4/2023
EP   4254869 A2   10/2023
RU   2421792 C2   6/2011

OTHER PUBLICATIONS

Christos Kyrkou; Towards artificial-intelligence-based cybersecurity for robustifying automated driving systems against camera sensor attacks; IEEE 2020; pp. 476-481.*

(Continued)

*Primary Examiner* — Monjur Rahim
(74) *Attorney, Agent, or Firm* — M&B IP Analysts, LLC

(57) ABSTRACT

A system and method for applying cybersecurity policies across multiple computing environments is presented. The method includes: generating an inspectable disk from a disk of a first workload deployed in a first computing environment, the computing environment including a cybersecurity policy applicable to a cybersecurity object; detecting the cybersecurity object on the inspectable disk; generating a policy exception; generating a representation of the cybersecurity object and the first workload in a security database, wherein the security database includes a representation of the first computing environment and a representation of a second computing environment which is associated with the first computing environment; detecting in the representation of the second computing environment a representation of a second workload associated with the representation of the first workload; and applying the policy exception to the (Continued)

second workload based on detecting that the second workload is associated with the first workload.

13 Claims, 10 Drawing Sheets

(58) Field of Classification Search
USPC .......................................................... 726/23
See application file for complete search history.

(56) References Cited

U.S. PATENT DOCUMENTS

| | | | |
|---|---|---|---|
| 7,784,101 B2 | 8/2010 | Verbowski et al. | |
| 8,200,965 B2 | 6/2012 | Fujibayashi et al. | |
| 8,352,431 B1 | 1/2013 | Protopopov et al. | |
| 8,412,688 B1 | 4/2013 | Armangau et al. | |
| 8,413,239 B2 | 4/2013 | Sutton | |
| 8,417,967 B2 | 4/2013 | Foster et al. | |
| 8,499,354 B1 | 7/2013 | Satish et al. | |
| 8,595,822 B2 | 11/2013 | Schrecker et al. | |
| 8,701,200 B2 | 4/2014 | Naldurg et al. | |
| 8,789,049 B2 | 7/2014 | Hutchins et al. | |
| 8,898,481 B1* | 11/2014 | Osburn, III | H04L 67/12 |
| | | | 713/192 |
| 8,914,406 B1 | 12/2014 | Haugsnes | |
| 9,009,836 B1 | 4/2015 | Yarykin et al. | |
| 9,094,379 B1 | 7/2015 | Miller | |
| 9,119,017 B2 | 8/2015 | Sinha | |
| 9,165,142 B1 | 10/2015 | Sanders et al. | |
| 9,172,621 B1 | 10/2015 | Dippenaar | |
| 9,330,273 B2 | 5/2016 | Khetawat et al. | |
| 9,369,433 B1 | 6/2016 | Paul | |
| 9,419,996 B2 | 8/2016 | Porat | |
| 9,438,634 B1 | 9/2016 | Ross et al. | |
| 9,467,473 B2 | 10/2016 | Jayaraman | |
| 9,544,327 B1 | 1/2017 | Sharma et al. | |
| 9,563,385 B1 | 2/2017 | Kowalski et al. | |
| 9,569,328 B2* | 2/2017 | Pavlov | G06F 11/0718 |
| 9,582,662 B1 | 2/2017 | Messick et al. | |
| 9,596,235 B2 | 3/2017 | Badam et al. | |
| 9,607,104 B1 | 3/2017 | Turner et al. | |
| 9,646,172 B1 | 5/2017 | Hahn | |
| 9,661,009 B1* | 5/2017 | Karandikar | H04L 63/1408 |
| 9,672,355 B2 | 6/2017 | Titonis et al. | |
| 9,712,503 B1 | 7/2017 | Ahmed | |
| 9,892,261 B2 | 2/2018 | Joram et al. | |
| 10,002,247 B2 | 6/2018 | Suarez et al. | |
| 10,032,032 B2 | 7/2018 | Suarez et al. | |
| 10,063,445 B1 | 8/2018 | Preece | |
| 10,135,826 B2 | 11/2018 | Reddy | |
| 10,229,125 B2 | 3/2019 | Goodman et al. | |
| 10,255,370 B2 | 4/2019 | Carpenter et al. | |
| 10,360,025 B2 | 7/2019 | Foskett et al. | |
| 10,412,103 B2 | 9/2019 | Haugsnes | |
| 10,412,109 B2 | 9/2019 | Loureiro et al. | |
| 10,459,664 B2 | 10/2019 | Dreier et al. | |
| 10,503,904 B1 | 12/2019 | Singh et al. | |
| 10,536,471 B1 | 1/2020 | Derbeko et al. | |
| 10,540,499 B2 | 1/2020 | Wailly et al. | |
| 10,552,610 B1 | 2/2020 | Vashisht et al. | |
| 10,554,507 B1* | 2/2020 | Siddiqui | G06F 21/562 |
| 10,567,468 B2 | 2/2020 | Perlmutter | |
| 10,572,226 B2 | 2/2020 | Biskup et al. | |
| 10,574,675 B2 | 2/2020 | Peppe et al. | |
| 10,623,386 B1 | 4/2020 | Bernat et al. | |
| 10,630,642 B2* | 4/2020 | Clark | G06F 21/606 |
| 10,664,619 B1 | 5/2020 | Marelas | |
| 10,691,636 B2 | 6/2020 | Tabaaloute et al. | |
| 10,721,260 B1 | 7/2020 | Schlarp et al. | |
| 10,725,775 B2 | 7/2020 | Suarez et al. | |
| 10,735,430 B1 | 8/2020 | Stoler | |
| 10,735,442 B1 | 8/2020 | Swackhamer | |
| 10,791,138 B1 | 9/2020 | Siddiqui et al. | |
| 10,803,188 B1 | 10/2020 | Rajput et al. | |
| 10,831,898 B1 | 11/2020 | Wagner | |
| 10,915,626 B2 | 2/2021 | Tang | |
| 10,924,503 B1 | 2/2021 | Pereira et al. | |
| 10,972,484 B1 | 4/2021 | Swackhamer | |
| 10,997,293 B2 | 5/2021 | Wiest et al. | |
| 11,005,860 B1 | 5/2021 | Glyer et al. | |
| 11,016,954 B1 | 5/2021 | Babocichin et al. | |
| 11,044,118 B1 | 6/2021 | Reed et al. | |
| 11,055,414 B2 | 7/2021 | Claes | |
| 11,064,032 B1 | 7/2021 | Yang et al. | |
| 11,099,976 B2 | 8/2021 | Khakare et al. | |
| 11,102,231 B2 | 8/2021 | Kraning et al. | |
| 11,165,652 B1 | 11/2021 | Byrne | |
| 11,216,563 B1 | 1/2022 | Veselov et al. | |
| 11,245,730 B2 | 2/2022 | Bailey | |
| 11,271,961 B1 | 3/2022 | Berger | |
| 11,334,670 B2 | 5/2022 | Franco et al. | |
| 11,366,897 B1 | 6/2022 | Ramanathan et al. | |
| 11,388,183 B2 | 7/2022 | Hoopes et al. | |
| 11,405,426 B2 | 8/2022 | Nguyen | |
| 11,444,974 B1 | 9/2022 | Shakhzadyan | |
| 11,483,317 B1 | 10/2022 | Bolignano et al. | |
| 11,496,498 B2 | 11/2022 | Wright et al. | |
| 11,496,519 B1 | 11/2022 | Gupta et al. | |
| 11,503,063 B2 | 11/2022 | Rao | |
| 11,507,672 B1 | 11/2022 | Pagnozzi et al. | |
| 11,516,222 B1 | 11/2022 | Srinivasan et al. | |
| 11,520,907 B1 | 12/2022 | Borowiec et al. | |
| 11,546,360 B2* | 1/2023 | Woodford | G06F 21/36 |
| 11,556,659 B1 | 1/2023 | Kumar et al. | |
| 11,558,401 B1* | 1/2023 | Vashisht | H04L 63/1416 |
| 11,558,423 B2* | 1/2023 | Gordon | H04L 63/0245 |
| 11,567,751 B2 | 1/2023 | Cosentino et al. | |
| 11,570,090 B2 | 1/2023 | Shen et al. | |
| 11,575,696 B1 | 2/2023 | Ithal et al. | |
| 11,614,956 B2* | 3/2023 | Tsirkin | G06F 21/602 |
| | | | 713/193 |
| 11,645,390 B2* | 5/2023 | Vijayvargiya | G06F 21/566 |
| | | | 726/23 |
| 11,662,928 B1 | 5/2023 | Kumar et al. | |
| 11,663,340 B2 | 5/2023 | Wu et al. | |
| 11,669,386 B1* | 6/2023 | Abrol | G06F 11/1076 |
| | | | 714/15 |
| 11,700,233 B2 | 7/2023 | St. Pierre | |
| 11,750,566 B1 | 9/2023 | Montilla Lugo | |
| 11,757,844 B2 | 9/2023 | Xiao | |
| 11,770,398 B1 | 9/2023 | Erlingsson | |
| 11,792,284 B1 | 10/2023 | Nanduri | |
| 11,799,874 B1 | 10/2023 | Lichtenstein et al. | |
| 11,803,766 B1 | 10/2023 | Srinivasan | |
| 11,841,945 B1 | 12/2023 | Fogel et al. | |
| 11,914,707 B1 | 2/2024 | Ramanathan et al. | |
| 11,922,220 B2* | 3/2024 | Haghighat | G06F 21/53 |
| 11,936,785 B1 | 3/2024 | Shemesh et al. | |
| 12,019,770 B2 | 6/2024 | Nilsson et al. | |
| 12,050,696 B2 | 7/2024 | Pieno et al. | |
| 12,058,177 B2 | 8/2024 | Crabtree et al. | |
| 2003/0188194 A1 | 10/2003 | Currie et al. | |
| 2003/0217039 A1 | 11/2003 | Kurtz et al. | |
| 2005/0050365 A1 | 3/2005 | Seki et al. | |
| 2005/0251863 A1 | 11/2005 | Sima | |
| 2005/0283645 A1* | 12/2005 | Turner | G06F 11/1076 |
| | | | 714/4.11 |
| 2007/0174915 A1 | 7/2007 | Gribble et al. | |
| 2007/0271360 A1 | 11/2007 | Sahita et al. | |
| 2008/0075283 A1 | 3/2008 | Takahashi | |
| 2008/0221833 A1 | 9/2008 | Brown et al. | |
| 2008/0307020 A1 | 12/2008 | Ko et al. | |
| 2008/0320594 A1 | 12/2008 | Jiang | |
| 2009/0106256 A1 | 4/2009 | Safari et al. | |
| 2009/0271863 A1 | 10/2009 | Govindavajhala et al. | |
| 2010/0242082 A1 | 9/2010 | Keene et al. | |
| 2010/0281275 A1 | 11/2010 | Lee et al. | |
| 2011/0055361 A1 | 3/2011 | Dehaan | |
| 2011/0276806 A1 | 11/2011 | Casper et al. | |
| 2012/0110651 A1 | 5/2012 | Van Biljon et al. | |
| 2012/0297206 A1 | 11/2012 | Nord et al. | |
| 2013/0024940 A1 | 1/2013 | Hutchins et al. | |
| 2013/0054890 A1 | 2/2013 | Desai et al. | |
| 2013/0124669 A1 | 5/2013 | Anderson et al. | |

(56) References Cited

U.S. PATENT DOCUMENTS

| | | |
|---|---|---|
| 2013/0160119 A1 | 6/2013 | Sartin |
| 2013/0160129 A1 | 6/2013 | Sartin |
| 2013/0290708 A1 | 10/2013 | Diaz et al. |
| 2014/0096134 A1 | 4/2014 | Barak |
| 2014/0115578 A1 | 4/2014 | Cooper et al. |
| 2014/0237537 A1 | 8/2014 | Manmohan |
| 2014/0317677 A1 | 10/2014 | Vaidya |
| 2014/0337613 A1 | 11/2014 | Martini |
| 2015/0033305 A1 | 1/2015 | Shear |
| 2015/0055647 A1 | 2/2015 | Roberts |
| 2015/0163192 A1 | 6/2015 | Jain |
| 2015/0172321 A1 | 6/2015 | Kirti et al. |
| 2015/0254364 A1* | 9/2015 | Piduri ............... G06F 16/904 715/234 |
| 2015/0304302 A1 | 10/2015 | Zhang et al. |
| 2015/0310215 A1 | 10/2015 | McBride et al. |
| 2015/0319160 A1 | 11/2015 | Ferguson et al. |
| 2016/0063466 A1 | 3/2016 | Sheridan et al. |
| 2016/0078231 A1 | 3/2016 | Bach et al. |
| 2016/0103669 A1 | 4/2016 | Gamage et al. |
| 2016/0105454 A1 | 4/2016 | Li |
| 2016/0140352 A1 | 5/2016 | Nickolov |
| 2016/0156664 A1 | 6/2016 | Nagaratnam |
| 2016/0224600 A1* | 8/2016 | Munk ................ G06Q 20/08 |
| 2016/0299708 A1 | 10/2016 | Yang et al. |
| 2016/0366185 A1 | 12/2016 | Lee et al. |
| 2017/0026416 A1 | 1/2017 | Carpenter et al. |
| 2017/0034198 A1 | 2/2017 | Powers et al. |
| 2017/0070506 A1 | 3/2017 | Reddy |
| 2017/0104755 A1 | 4/2017 | Arregoces |
| 2017/0111384 A1 | 4/2017 | Loureiro et al. |
| 2017/0185784 A1 | 6/2017 | Madou |
| 2017/0187743 A1 | 6/2017 | Madou |
| 2017/0223024 A1 | 8/2017 | Desai |
| 2017/0230179 A1 | 8/2017 | Mannan et al. |
| 2017/0237560 A1 | 8/2017 | Mueller et al. |
| 2017/0257347 A1 | 9/2017 | Yan |
| 2017/0285978 A1 | 10/2017 | Manasse |
| 2017/0374136 A1 | 12/2017 | Ringdahl |
| 2018/0004950 A1 | 1/2018 | Gupta et al. |
| 2018/0007087 A1 | 1/2018 | Grady et al. |
| 2018/0026995 A1 | 1/2018 | Dufour et al. |
| 2018/0027009 A1 | 1/2018 | Santos |
| 2018/0063290 A1 | 3/2018 | Yang et al. |
| 2018/0150412 A1 | 5/2018 | Manasse |
| 2018/0159882 A1 | 6/2018 | Brill |
| 2018/0181310 A1 | 6/2018 | Feinberg et al. |
| 2018/0191726 A1 | 7/2018 | Luukkala |
| 2018/0219888 A1 | 8/2018 | Apostolopoulos |
| 2018/0234459 A1 | 8/2018 | Kung |
| 2018/0239902 A1 | 8/2018 | Godard |
| 2018/0260566 A1 | 9/2018 | Chaganti et al. |
| 2018/0270268 A1 | 9/2018 | Gorodissky et al. |
| 2018/0276084 A1 | 9/2018 | Mitkar et al. |
| 2018/0278639 A1 | 9/2018 | Bernstein et al. |
| 2018/0288129 A1 | 10/2018 | Joshi et al. |
| 2018/0309747 A1 | 10/2018 | Sweet et al. |
| 2018/0321993 A1 | 11/2018 | McClory |
| 2018/0341768 A1 | 11/2018 | Marshall et al. |
| 2018/0359058 A1 | 12/2018 | Kurian |
| 2018/0359059 A1 | 12/2018 | Kurian |
| 2019/0007271 A1 | 1/2019 | Rickards et al. |
| 2019/0058722 A1 | 2/2019 | Levin et al. |
| 2019/0068617 A1 | 2/2019 | Coleman |
| 2019/0068627 A1 | 2/2019 | Thampy |
| 2019/0104140 A1 | 4/2019 | Gordeychik et al. |
| 2019/0116111 A1* | 4/2019 | Izard .................. H04L 45/745 |
| 2019/0121986 A1 | 4/2019 | Stopel et al. |
| 2019/0132350 A1* | 5/2019 | Smith ................ G06F 21/60 |
| 2019/0149604 A1 | 5/2019 | Jahr |
| 2019/0166129 A1 | 5/2019 | Gaetjen et al. |
| 2019/0171811 A1 | 6/2019 | Daniel et al. |
| 2019/0191417 A1 | 6/2019 | Baldemair et al. |
| 2019/0205267 A1 | 7/2019 | Richey et al. |
| 2019/0207966 A1 | 7/2019 | Vashisht et al. |
| 2019/0220575 A1 | 7/2019 | Boudreau et al. |
| 2019/0245883 A1 | 8/2019 | Gorodissky et al. |
| 2019/0260764 A1 | 8/2019 | Humphrey et al. |
| 2019/0278928 A1 | 9/2019 | Rungta et al. |
| 2019/0354675 A1 | 11/2019 | Gan et al. |
| 2019/0377988 A1 | 12/2019 | Qi et al. |
| 2020/0007314 A1 | 1/2020 | Vouk et al. |
| 2020/0007569 A1 | 1/2020 | Dodge et al. |
| 2020/0012659 A1 | 1/2020 | Dageville et al. |
| 2020/0012818 A1 | 1/2020 | Levin et al. |
| 2020/0028862 A1 | 1/2020 | Lin |
| 2020/0044916 A1 | 2/2020 | Kaufman et al. |
| 2020/0050440 A1 | 2/2020 | Chuppala et al. |
| 2020/0082094 A1 | 3/2020 | McAllister et al. |
| 2020/0106782 A1 | 4/2020 | Sion |
| 2020/0125352 A1 | 4/2020 | Kannan |
| 2020/0145405 A1 | 5/2020 | Bosch et al. |
| 2020/0244678 A1 | 7/2020 | Shua |
| 2020/0244692 A1* | 7/2020 | Shua .................. H04L 63/1416 |
| 2020/0259852 A1 | 8/2020 | Wolff et al. |
| 2020/0287927 A1 | 9/2020 | Zadeh et al. |
| 2020/0320845 A1 | 10/2020 | Livny et al. |
| 2020/0336489 A1 | 10/2020 | Wuest et al. |
| 2020/0382556 A1 | 12/2020 | Woolward et al. |
| 2020/0387357 A1 | 12/2020 | Mathon et al. |
| 2020/0389431 A1 | 12/2020 | St. Pierre |
| 2020/0389469 A1 | 12/2020 | Litichever et al. |
| 2020/0409741 A1 | 12/2020 | Dornemann et al. |
| 2021/0026932 A1 | 1/2021 | Boudreau et al. |
| 2021/0042263 A1 | 2/2021 | Zdornov et al. |
| 2021/0089662 A1 | 3/2021 | Muniswamy-Reddy et al. |
| 2021/0105304 A1 | 4/2021 | Kraning et al. |
| 2021/0144517 A1 | 5/2021 | Guim Bernat et al. |
| 2021/0149788 A1 | 5/2021 | Downie |
| 2021/0158835 A1* | 5/2021 | Hill .................... G10L 21/10 |
| 2021/0168150 A1 | 6/2021 | Ross et al. |
| 2021/0176123 A1 | 6/2021 | Plamondon |
| 2021/0176164 A1 | 6/2021 | Kung et al. |
| 2021/0185073 A1 | 6/2021 | Ewaida et al. |
| 2021/0200881 A1 | 7/2021 | Joshi et al. |
| 2021/0203684 A1 | 7/2021 | Maor et al. |
| 2021/0211453 A1 | 7/2021 | Cooney |
| 2021/0216630 A1 | 7/2021 | Karr |
| 2021/0218567 A1 | 7/2021 | Richards et al. |
| 2021/0226812 A1 | 7/2021 | Park |
| 2021/0226928 A1 | 7/2021 | Crabtree et al. |
| 2021/0234889 A1* | 7/2021 | Burle ................ H04L 63/1433 |
| 2021/0263802 A1 | 8/2021 | Gottemukkula et al. |
| 2021/0306416 A1 | 9/2021 | Mukhopadhyay et al. |
| 2021/0314342 A1 | 10/2021 | Oberg |
| 2021/0320794 A1 | 10/2021 | Auh et al. |
| 2021/0329019 A1 | 10/2021 | Shua et al. |
| 2021/0334386 A1* | 10/2021 | AlGhamdi .......... H04L 63/1433 |
| 2021/0357246 A1 | 11/2021 | Kumar et al. |
| 2021/0360032 A1 | 11/2021 | Crabtree et al. |
| 2021/0368045 A1 | 11/2021 | Verma |
| 2021/0382995 A1 | 12/2021 | Massiglia et al. |
| 2021/0382997 A1* | 12/2021 | Yi ...................... G06F 21/577 |
| 2021/0409486 A1 | 12/2021 | Martinez |
| 2022/0012771 A1 | 1/2022 | Gustafson |
| 2022/0030020 A1 | 1/2022 | Huffman |
| 2022/0053011 A1 | 2/2022 | Rao et al. |
| 2022/0086173 A1 | 3/2022 | Yavo et al. |
| 2022/0131888 A1 | 4/2022 | Kanso |
| 2022/0156396 A1* | 5/2022 | Bednash ............. G06F 21/554 |
| 2022/0179964 A1 | 6/2022 | Qiao et al. |
| 2022/0182403 A1 | 6/2022 | Mistry |
| 2022/0188273 A1 | 6/2022 | Koorapati et al. |
| 2022/0197926 A1 | 6/2022 | Passey et al. |
| 2022/0210053 A1 | 6/2022 | Du |
| 2022/0215101 A1 | 7/2022 | Rioux et al. |
| 2022/0232024 A1 | 7/2022 | Kapoor |
| 2022/0232042 A1 | 7/2022 | Crabtree et al. |
| 2022/0247791 A1 | 8/2022 | Duminuco et al. |
| 2022/0263656 A1 | 8/2022 | Moore |
| 2022/0284362 A1 | 9/2022 | Bellinger et al. |
| 2022/0309166 A1 | 9/2022 | Shenoy et al. |
| 2022/0326861 A1 | 10/2022 | Shachar et al. |
| 2022/0327119 A1 | 10/2022 | Gasper et al. |

(56) References Cited

U.S. PATENT DOCUMENTS

| | | |
|---|---|---|
| 2022/0342690 A1 | 10/2022 | Shua |
| 2022/0342997 A1 | 10/2022 | Watanabe et al. |
| 2022/0345481 A1 | 10/2022 | Shua |
| 2022/0350931 A1 | 11/2022 | Shua |
| 2022/0357992 A1 | 11/2022 | Karpovsky |
| 2022/0374519 A1 | 11/2022 | Botelho et al. |
| 2022/0400128 A1 | 12/2022 | Kfir et al. |
| 2022/0407841 A1 | 12/2022 | Karpowicz et al. |
| 2022/0407889 A1 | 12/2022 | Narigapalli et al. |
| 2022/0413879 A1 | 12/2022 | Passey et al. |
| 2022/0414103 A1* | 12/2022 | Upadhyay ............. G06F 16/256 |
| 2022/0417011 A1 | 12/2022 | Shua |
| 2022/0417219 A1 | 12/2022 | Sheriff |
| 2023/0007014 A1 | 1/2023 | Narayan |
| 2023/0040635 A1 | 2/2023 | Narayan |
| 2023/0075355 A1 | 3/2023 | Twigg |
| 2023/0087093 A1 | 3/2023 | Ithal et al. |
| 2023/0093527 A1 | 3/2023 | Shua |
| 2023/0095756 A1 | 3/2023 | Wilkinson et al. |
| 2023/0110080 A1 | 4/2023 | Hen |
| 2023/0123477 A1* | 4/2023 | Luttwak ............. H04L 63/1425 726/25 |
| 2023/0125134 A1* | 4/2023 | Raleigh ............. H04L 63/1408 455/410 |
| 2023/0134674 A1* | 5/2023 | Quinn ................ G06F 11/1458 714/15 |
| 2023/0135240 A1 | 5/2023 | Cody et al. |
| 2023/0136839 A1 | 5/2023 | Sundararajan et al. |
| 2023/0164148 A1 | 5/2023 | Narayan |
| 2023/0164182 A1 | 5/2023 | Kothari et al. |
| 2023/0169165 A1 | 6/2023 | Williams et al. |
| 2023/0171271 A1 | 6/2023 | Williams et al. |
| 2023/0192418 A1* | 6/2023 | Horowitz ............. B65G 47/46 198/349 |
| 2023/0208870 A1* | 6/2023 | Yellapragada ......... G06F 21/53 726/22 |
| 2023/0224319 A1 | 7/2023 | Isoyama et al. |
| 2023/0231867 A1 | 7/2023 | Rampura Venkatachar |
| 2023/0237068 A1* | 7/2023 | Sillifant ................ G06F 16/211 707/626 |
| 2023/0254330 A1 | 8/2023 | Singh |
| 2023/0297666 A1 | 9/2023 | Atamli et al. |
| 2023/0325814 A1* | 10/2023 | Vijayan ............. G06Q 20/3829 705/66 |
| 2023/0336550 A1 | 10/2023 | Lidgi et al. |
| 2023/0336578 A1 | 10/2023 | Lidgi et al. |
| 2023/0376586 A1 | 11/2023 | Shemesh et al. |
| 2024/0007492 A1* | 1/2024 | Shen .................. H04L 63/1425 |
| 2024/0037229 A1* | 2/2024 | Pabon ................. G06F 9/45558 |
| 2024/0045838 A1 | 2/2024 | Reiss et al. |
| 2024/0073115 A1 | 2/2024 | Chakraborty et al. |
| 2024/0080329 A1* | 3/2024 | Reed ..................... H04L 67/306 |
| 2024/0080332 A1 | 3/2024 | Ganesh et al. |
| 2024/0146818 A1 | 5/2024 | Cody et al. |
| 2024/0241752 A1 | 7/2024 | Crabtree et al. |

OTHER PUBLICATIONS

International Search Report, PCT/IB23/55312. ISA/US, Commissioner for Patents, Alexandria, Virginia. Dated Aug. 30, 2023.
Microsoft Build. "Introduction to Azure managed disks". Aug. 21, 2023, https://docs.microsoft.com/en-us/azure/virtual-machines/managed-disks-overview.
Written Opinion of the International Searching Authority, PCT/IB23/55312. ISA/US Commissioner for Patents, Alexandria, Virginia. Dated Aug. 30, 2023.
No stated author; Downdetector; 2020; retrieved from the Internet https://web.archive.org/web/20201226001244/https://downdetector.com/; pp. 1-8, as printed. (Year: 2020).
No stated author; How to Run a Ping Test (Windows) 2020; retrieved from the Internet https://web.archive.org/web/20200811194856/https://support.shaw.ca/t5/internet-articles/how-to-run-a-ping-test-windows/ta-p/6677; pp. 1-6 as printed. (Year: 2020).
No stated author; IsItoownRightNow; 2020; retrieved from the Internet https://web.archive.org/web/20201202121557/https://www.isitdownrightnow.com/; pp. 1-2 as printed. (Year: 2020).
Ali Gholami; Security and Privacy of Sensitive Data in Cloud Computing: a Survey of Recent Developments; ARIX:2016; pp. 131-150.
Guo, yu et al. Enabling Encrypted Rich Queries in Distributed Key-Value Stores. IEEE Transactions on Parallel and Distributed Systems, vol. 30, Issue: 6. https://ieeexplore.ieee.org/stamp/stamp.jsp?tp=&arnumber=8567979 (Year: 2019).
Henry Hanping Feng; Anomaly Detection Using Call Stack Information; IEEE: Year:2003; pp. 1-14.
International Search Report for PCT Application No. PCT/IB2022/060940 dated Feb. 1, 2023. The International Bureau of WIPO.
International Search Report for PCT/IB2023/050848, dated May 9, 2023. International Bureau of WIPO.
International Search Report of PCT/IB2023/058074, dated Nov. 20, 2023. Searching Authority United States Patent and Trademark Office, Alexandria, Virginia.
Jordan, M. et al. Enabling pervasive encryption through IBM Z stack innovations. IBM Journal of Research and Development, vol. 62 Issue: 2/3, https://ieeexplore.ieee.org/stamp/stamp.jsp?tp&arnumber=8270590 (Year: 2018).
Kumar, Anuj et al. A New Approach for Security in Cloud Data Storage for IOT Applications Using Hybrid Cryptography Technique. 2020 International Conference on Power Electronics & IoT Applications in Renewable Energy and its Control. https://ieeexplore.ieee.org/stamp/stamp.jsp?tp=&arnumber=9087010 (Year: 2020).
Leibenger, Dominik et al. EncFS goes multi-user: Adding access control to an encrypted file system. 2016 IEEE Conference on Communications and Network Security (CNS). https://ieeexoplore.ieee.org/stamp/stamp.jsp?tp=&arnumber=7860544 (Year: 2016).
Microsoft Docs. "Create a VM from a managed image". Article. Jan. 5, 2022. https://docs.microsoft.com/en-us/azure/virtual-machines/windows/create-vm-generalized-managed.
Mishra, Bharati; Jena, Debasish et al. Securing Files in the Cloud. 2016 IEEE International Conference on Cloud Computing in Emerging Markets (CCEM). https://ieeexplore.ieee.org/stamp/stamp.jsp?tp=&arnumber=7819669 (Year: 2016).
Sahil Suneja; Safe Inspection of Live Virtual Machines; IEEE; Year:2017; pp. 97-111.
Shuvo, Arfatul Mowla et al. Storage Efficient Data Security Model for Distributed Cloud Storage. 2020 IEEE 8th R10 Humanitarian Technology Conference (R10-HTC). https://ieeexplore.ieee.org/stamp/stamp.jsp?tp=&arnumber=9356962 (Year: 2020).
Siqi Ma; Certified Copy? Understanding Security Risks of Wi-Fi Hotspot based Android Data Clone Services; ACM; Year: 2021; pp. 320-331.
Written Opinion of the International Searching Authority for PCT Application No. PCT/IB2022/060940 dated Feb. 1, 2023. The International Bureau of WIPO.
Written Opinion of the Searching Authority for PCT/IB2023/050848, dated May 9, 2023. International Bureau of WIPO.
Written Opinion of the Searching Authority of PCT/IB2023/058074, dated Nov. 20, 2023. Searching Authority United States Patent and Trademark Office, Alexandria, Virginia.
Zhang et al. BMC Bioinformatics 2014. "On finding bicliques in bipartite graphs: a novel algorithm and its application to the integration of diverse biological data types". http://www.biomedcentral.com/1471-2105/15/110.
Chang, Bing et al. MobiCeal: Towards Secure and Practical Plausibly Deniable Encryption on Mobile Devices. 2018 48th Annual IEEE/IFIP International Conference on Dependable Systems and Networks (DSN). https://ieeexplore.ieee.org/stamp/stamp.jsp?tp=&arnumber=8416506 (Year: 2018).
Islam, Md Shihabul et al. Secure Real-Time Heterogeneous IoT Data Management System. 2019 First IEEE International Conference on Trust, Privacy and Security in Intelligent Systems and Applications (TPS-ISA). https://ieeexplore.ieee.org/stamp/stamp.jsp?tp=&arnumber=9014355 (Year: 2019).
Safaryan, Olga A et al. Cryptographic Algorithm Implementation for Data Encryption in DBMS MS SQL Server. 2020 IEEE East-

(56) References Cited

OTHER PUBLICATIONS

West Design & Test Symposium (EWDTS). https://ieeexplore.ieee.org/stamp/stamp.jsp?tp=&arnumber=9224775 (Year: 2020).
Wassermann, Sarah et al. ViCrypt to the Rescue: Real-Time, Machine-Learning-Driven Video-QoE Monitoring for Encrypted Streaming Traffic. IEEE Transactions on Network and Service Management, vol. 17, Issue: 4. https://ieeexplore.ieee.org/stamp/stamp.jsp?tp=&arnumber=9250645 (Year: 2020).

* cited by examiner

```
resource "aws_instance" "tfvm" {
    ami = "ami-0885b1f6bd170450c"
    instance_type = "t2.micro"
    vpc_security_group_ids = [ aws_security_group.websg.id ]
}
```

- 600
- 610 resource
- 612 instance_type
- 614 vpc_security_group_ids

FIGURE 6

DETECTING SECURITY EXCEPTIONS ACROSS MULTIPLE COMPUTE ENVIRONMENTS

CROSS-REFERENCE TO RELATED APPLICATIONS

This application is a continuation-in-part of U.S. Non-Provisional patent application Ser. No. 17/664,508 filed May 23, 2022, the entire contents of which are hereby incorporated by reference herein.

TECHNICAL FIELD

The present disclosure relates generally to cybersecurity and, in particular, to applying security policies across multiple computing environments, utilizing infrastructure as code and disk cloning for cybersecurity inspection.

BACKGROUND

As users migrate data storage, processing, and management tasks to decentralized, off-location devices, platforms, and services, the limitations of such devices, platforms, and services, also referred to as cloud environments, platforms, and the like, may impact a user's data operations. Specifically, vulnerabilities within cloud-deployed resources and processes may present unique challenges requiring remediation. Due to the scale and structure of cloud systems, detection of workload vulnerabilities, which detection may be readily-provided in non-cloud deployments, may require numerous, complex tools and operations.

Current solutions to cloud workload vulnerability scanning challenges require the deployment of specialized tools, including scanning agents directed to maintenance of virtual machines (VMs), where operation and maintenance of such tools may be costly, time-consuming, or both. Agent-dependent processes fail to provide for scanning of containers, such as containers managed using Kubernetes®, and other, like, container-management platforms, and may fail to provide for coverage of serverless applications. Where such agent-implementation processes fail to provide for full cloud workload vulnerability scanning, additional methods, such as snapshot-based scanning, may supplement implemented solutions.

Snapshot-based scanning, wherein static "snapshots" of processes, services, data, and the like, are analyzed in an environment separate from the source environment, provides for agentless scanning. Snapshot-based scanning is applied in various fields, including computer forensics, to provide for analysis of services, processes, data, and the like, in locations or environments other than those from which the snapshots are collected, as well as retrospective analysis. However, the applicability of snapshot-based scanning is limited in multi-tenant systems, such as shared cloud platforms, as cloud tenants may desire high levels of data protection during snapshot generation, transfer, and analysis. Further, snapshot-based scanning methods, as well as hybrid methods including both agent-implemented and snapshot-based methods, may be inapplicable to certain cloud system structures and environments, which may include various objects, processes, and the like, which such methods may not be configured to process, as such processing may require, as examples, separate analysis of container repositories, VM snapshots, and application programming interfaces (API) for serverless applications, where existing solutions fail to provide such integrated functionality.

Further complicating matters is deployment of cloud environments utilizing infrastructure as code (IaC) systems. While aimed at decreasing human error when deploying cloud environments, there is often a drift from the original configuration code to the current state of the production environment. A complication may arise due, for example, to different teams working on the development environment (configuration code) and the production environment (deployed instances). Current tools such as Checkov and Accurics allow to scan for misconfigurations and policy violations, but are limited to scanning only configuration code. CI/CD (continuous integration/continuous deployment) and drifting configurations mean that scanning the configuration code is not always enough to get a precise understanding of where threats and vulnerabilities currently exist, since this is a in practice a moving target.

It is apparent that it would be advantageous to provide a solution which can scan for vulnerabilities in an improved and efficient manner, and provide a solution which encompasses a technology stack from code, through staging, to production.

Furthermore, it would, therefore, be advantageous to provide a solution that would overcome the challenges noted above.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, method may include generating an inspectable disk from a disk of a first workload deployed in a first computing environment, the computing environment including a cybersecurity policy applicable to a cybersecurity object. Method may also include detecting the cybersecurity object on the inspectable disk. Method may furthermore include generating a policy exception based on the cybersecurity object and the first workload. Method may in addition include generating a representation of the cybersecurity object and the first workload in a security database, where the security database includes a representation of the first computing environment and a representation of a second computing environment which is associated with the first computing environment. Method may moreover include detecting in the representation of the second computing environment a representation of a second workload associated with the representation of the first workload. Method may also include applying the policy exception to the second workload based on detecting that the second workload is associated with the first workload. Other embodiments of this aspect include corresponding computer systems, apparatus, and computer programs recorded on one or more computer storage devices, each configured to perform the actions of the methods.

Implementations may include one or more of the following features. Method may include: detecting a first code object in a configuration code file, the configuration code file including a plurality of code objects; determining that the first workload is deployed based on the first code object; and applying the generated exception to the first code object. Method where generating the inspectable disk further comprises: cloning the disk of the workload into a cloned disk. Method may include: traversing a security graph to find a first node representing the first workload, where the security graph is the representation in the security database; and traversing the security graph to find a second node representing the second workload. Method may include: releasing the inspectable disk in response to determining that inspection is complete. Method may include: detecting a second cybersecurity object, the second cybersecurity object failing a policy of the first computing environment; and failing the first workload, in response to detecting the second cybersecurity object. Method may include: detecting in the representation a representation of a first object, the first object deployed in the first computing environment; detecting in the representation a representation of a second object, the second object deployed in the second computing environment; detecting in the representation a connection between the representation of the first object and the representation of the second object; and applying a policy of the first computing environment to the first object and the second object in response to detecting the connection. Implementations of the described techniques may include hardware, a method or process, or a computer tangible medium.

In one general aspect, non-transitory computer-readable medium may include one or more instructions that, when executed by one or more processors of a device, cause the device to: generate an inspectable disk from a disk of a first workload deployed in a first computing environment, the computing environment including a cybersecurity policy applicable to a cybersecurity object. Medium may furthermore detect the cybersecurity object on the inspectable disk. Medium may in addition generate a policy exception based on the cybersecurity object and the first workload. Medium may moreover generate a representation of the cybersecurity object and the first workload in a security database, where the security database includes a representation of the first computing environment and a representation of a second computing environment which is associated with the first computing environment. Medium may also detect in the representation of the second computing environment a representation of a second workload associated with the representation of the first workload. Medium may furthermore apply the policy exception to the second workload based on detecting that the second workload is associated with the first workload. Other embodiments of this aspect include corresponding computer systems, apparatus, and computer programs recorded on one or more computer storage devices, each configured to perform the actions of the methods.

In one general aspect, system may include a processing circuitry. System may also include a memory, the memory containing instructions that, when executed by the processing circuitry, configure the system to: generate an inspectable disk from a disk of a first workload deployed in a first computing environment, the computing environment including a cybersecurity policy applicable to a cybersecurity object. System may in addition detect the cybersecurity object on the inspectable disk. System may moreover generate a policy exception based on the cybersecurity object and the first workload. System may also generate a representation of the cybersecurity object and the first workload in a security database, where the security database includes a representation of the first computing environment and a representation of a second computing environment which is associated with the first computing environment. System may furthermore detect in the representation of the second computing environment a representation of a second workload associated with the representation of the first workload. System may in addition apply the policy exception to the second workload based on detecting that the second workload is associated with the first workload. Other embodiments of this aspect include corresponding computer systems, apparatus, and computer programs recorded on one or more computer storage devices, each configured to perform the actions of the methods.

Implementations may include one or more of the following features. System where the memory contains further instructions which when executed by the processing circuitry further configure the system to: detect a first code object in a configuration code file, the configuration code file including a plurality of code objects; determine that the first workload is deployed based on the first code object; and apply the generated exception to the first code object. System where the memory contains further instructions that, when executed by the processing circuitry for generating the inspectable disk, further configure the system to: clone the disk of the workload into a cloned disk. System where the memory contains further instructions which when executed by the processing circuitry further configure the system to: traverse a security graph to find a first node representing the first workload, where the security graph is the representation in the security database; and traverse the security graph to find a second node representing the second workload. System where the memory contains further instructions which when executed by the processing circuitry further configure the system to: release the inspectable disk in response to determining that inspection is complete. System where the memory contains further instructions which when executed by the processing circuitry further configure the system to: detect a second cybersecurity object, the second cybersecurity object failing a policy of the first computing environment; and fail the first workload, in response to detecting the second cybersecurity object. System where the memory contains further instructions which when executed by the processing circuitry further configure the system to: detect in the representation a representation of a first object, the first object deployed in the first computing environment; detect in the representation a representation of a second object, the second object deployed in the second computing environment; detect in the representation a connection between the representation of the first object and the representation of the second object; and apply a policy of the first computing environment to the first object and the second object in response to detecting the connection. Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIG. 6 is an example of a code object, shown in accordance with an embodiment.

DETAILED DESCRIPTION

Figure 1:
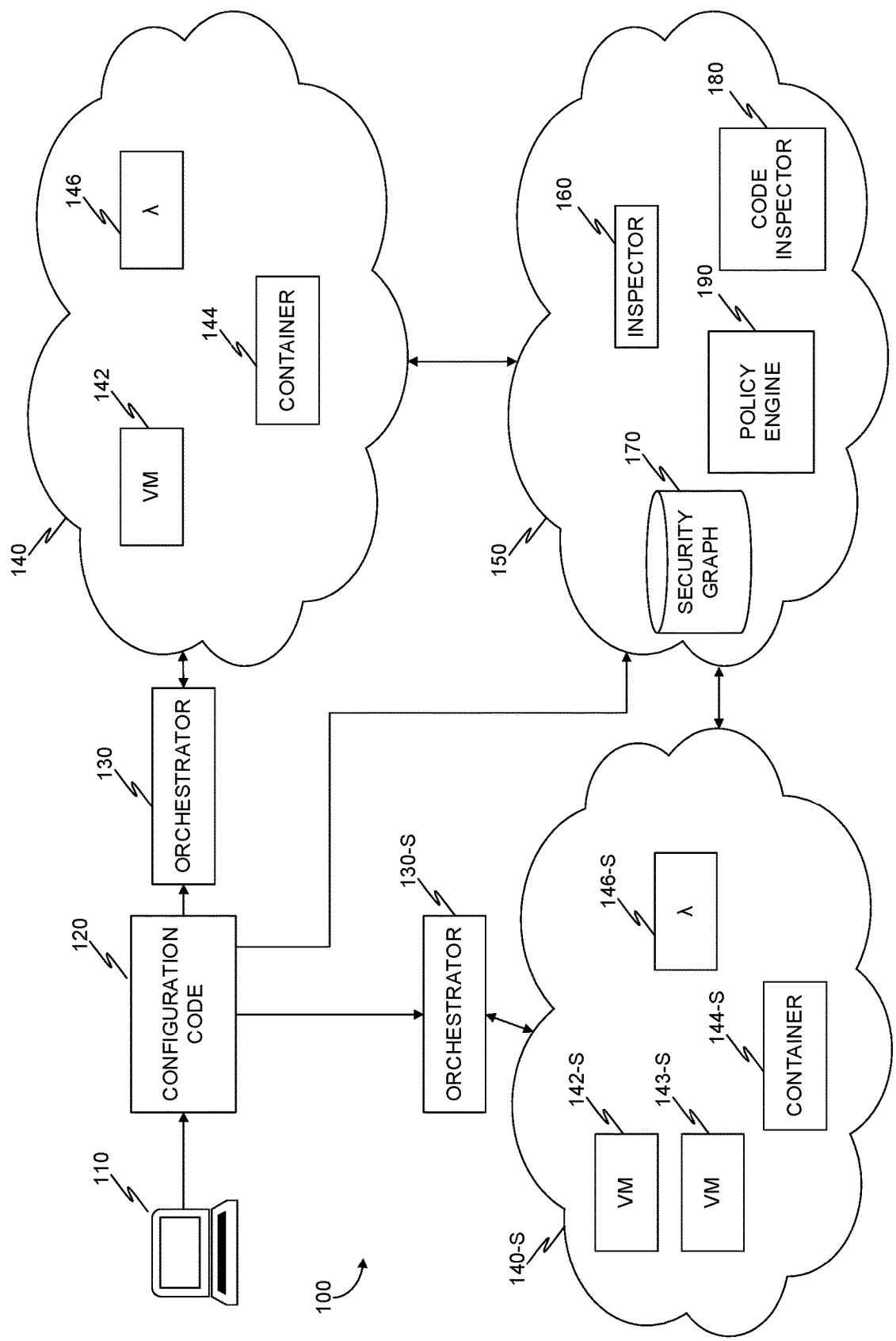
FIG. 1 is a network diagram of a monitored cloud environment utilizing infrastructure as code (IaC) utilized to describe the various embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 is a network diagram 100 of a monitored cloud environment utilizing infrastructure as code (IaC) utilized to describe the various embodiments.

A client device 110 generates a configuration code file 120 based on input from one or more users (e.g., software programmers). While a client device 110 is shown here for simplicity and pedagogical purposes, it should be readily apparent that the configuration code may be generated by a client device, a virtual workload in a cloud environment, and the like. Likewise, the configuration code may be generated by multiple different client devices, a single client device may generate multiple configuration codes, or any combination of these scenarios.

The configuration code file 120 may be implemented in a declaratory computer language. In a declaratory computer language, a user declares resources they would like to have as code objects, and an orchestrator 130 deploys instances in the cloud environment based on the declarations. In certain embodiments, multiple configuration code files 120 may be utilized. For example, a user may operate multiple cloud environments, each with its own configuration code. As another example, a user can declare a first resource type for a first cloud environment and for a second cloud environment in a first configuration code file, and a second resource type for the first cloud environment and the second cloud environment in a second configuration code file.

An orchestrator 130 receives the configuration code file 120. The orchestrator 130 configures a cloud environment 140 (production cloud environment) to deploy various instances based on the declarations of the configuration code file. An instance is a virtual workload, and may be, for example a virtual machine 142, container 144, or serverless function 146. The orchestrator 130 may perform deployment by assigning (also known as provisioning) cloud environment resources, such as processors, memory, storage, etc. to the virtual instance. The deployed instances are also known as a production environment. The configuration code may be implemented in a development (dev) environment, which may also be a cloud computing environment.

In some embodiments, a plurality of instances may be associated with a first object (not shown) of the configuration code file 120. This provides an advantage where it is required to deploy multiple instances which share similar configurations, such as web servers providing access to a website. Rather than configure each instance (also referred to as a workload) manually and individually, the orchestrator is able to deploy a number of the same instance based on the configuration code file 120.

In some embodiments the orchestrator 130 may configure a cloud-native orchestrator (not shown) in the cloud environment 140 to deploy the instances. This may be advantageous, for example, where instances need to be deployed in different cloud environments. For example, the same instances may be deployed simultaneously on Google® Cloud Platform (GCP), Amazon® Web Services (AWS), or Microsoft® Azure. This can be achieved by configuring the orchestrator 130 to generate native instructions for a cloud native orchestrator in each environment to deploy such instances. The native instructions may be generated by the orchestrator 130, which generates the instruction based on objects declared in the configuration code file 120. This method of deploying instances decreases errors by eliminating the need for a user to manually deploy each instance and configure each instance separately, and is also thus a faster method of deployment. In the example above a first load balancer may be deployed in a first cloud computing environment, and a second load balancer may be deployed in a second cloud computing environment, each cloud computing environment having different infrastructure from each other, wherein the first load balancer and the second load balancer are deployed based on the same code object from a configuration code file.

A second cloud environment 150 may be utilized for inspecting the first cloud environment 140 and generating security risk assessments with respect to instances in the first cloud environment 140. The second cloud environment 150 may include one or more inspectors, such as inspector 160. An inspector is a workload which inspects another workload for objects, such as secrets, files, folders, registry values, and so on. Each inspector may be configured to inspect for one or more different object types.

For example, an inspector 160, an inspection controller (not shown here), and the like, are configured to generate a request to inspect the virtual machine 142. The request may be received through an API (not shown) of the first cloud environment 140. A snapshot may be generated of a volume of the virtual machine 142, and sent to the second cloud environment 150. A container may be deployed in the second cloud environment and attached to a volume generated in the second cloud environment based on the received snapshot. The attached volume is then accessed by the inspector 160 to inspect the volume for a specific object type(s). The inspector 160 may generate data for storing on a security database 170. In an embodiment, the security database 170 is implemented as a graph database, e.g., Neo4j®.

In an embodiment, the inspector 160 is configured to detect a cybersecurity object. In an embodiment, a cybersecurity object indicates a cybersecurity issue, such as an exposure, a vulnerability, a misconfiguration, a permission escalation, a toxic combination, a combination thereof, and the like.

In some embodiments, a cybersecurity object is a secret, a certificate, a file, a folder, a binary, a library, an application, an operating system, a nested workload, a combination thereof, and the like.

A security graph 170 may be stored on a graph database. The security graph includes a plurality of nodes, at least a portion of which correspond to a resource or a principal. A resource may be a workload, such as a virtual machine, serverless function, container, and the like. A principal may be a user group, user account, service account, and the like. Generally, a principal acts on a resource to achieve a result. The security graph may further include enrichment nodes, which may indicate certain functionalities, network access, and the like. For example, an enrichment node may be used to indicate public internet access. Thus, a node corresponding to a workload which has public internet access, or can be accessed through a public internet connection, would be connected to an internet access node.

A code inspector 180 is further deployed in the second cloud environment 150. In an embodiment, more than one code inspector may be deployed. Configuration code may be generated by multiple different type of platforms, such as Pulumi®, Terraform®, and the like. For example, a first code inspector may inspect configuration code generated using Pulumi®, while a second code inspector may inspect configuration code generated using Terraform®. In an embodiment, the code inspector 120 is realized as a workload configured to receive configuration code and inspect the code to find one or more types of code objects. A type of code object may be, for example, a secret (such as public key, private key), resource type, policy identifier, role identifier, status of flags, and the like. A flag status may indicate that a certain object is allowed to perform certain actions, such as network access, or assume a role, such as an administrator role (in the case of a user or service account). The code inspector 180 may attempt to match the detected object(s) to one or more nodes in a security graph. This is discussed in more detail with respect to FIG. 5 below. Code inspectors are discussed in more detail in U.S. Non-Provisional patent application Ser. No. 17/532,557 the entire contents of which are incorporated herein by reference.

The second cloud environment 150 further includes a policy engine 190. A policy engine 190 may be implemented as a workload, such as a virtual machine or container. The policy engine 190 may include a plurality of rules, each of which may include a condition and an action. A rule may be implemented, for example, as an 'if-then' statement. In an embodiment, the policy engine 190 may periodically check if one or more of the rules are violated by a workload or account in the first cloud computing environment 140. The policy engine 190 may further includes policies, which indicate permissions associated with workloads, accounts, or both. For example, a policy may state that a user account belonging to a first user group is authorized to access the VM 142. In an embodiment, the policy engine 190 may be implemented in the first cloud environment 140, and accessible by the second cloud environment 150.

The configuration code 120 may be further accessed by a stage environment orchestrator 130-S. While this embodiment utilizes an orchestrator 130 for a production cloud environment 140, and a stage environment orchestrator 130-S for a staging cloud environment 140-S, it should be apparent that a single orchestrator may be used for both the production and stage environments. A staging cloud environment 140-S is a cloud computing environment which is practically identical to the production cloud environment 140, other than the presence of test workloads, or other changes which are tested in order to later deploy them in the production environment. A staging environment is used for testing purposes, for example to determine if a workload can handle a volume of expected traffic. Typically, workloads are deployed in a staging environment prior to deployment in a production environment, so as to detect any issues which the workload may cause in the production environment.

For example, a second VM 143-S is a workload which is deployed in the staging cloud environment 140-S, but not yet deployed in the production cloud environment 140. A first VM 142-S is a workload identical to VM 142, a container 144-S is a workload identical to the container 144 deployed in the production cloud environment 140, and a serverless function 146-S is identical to the serverless function 146.

It is common that workloads in the production environment 140 trigger errors, based for example on policies of the production cloud environment 140. A policy engine 190 may allow users to configure an exception to an error. For example, if a VM 142 triggers an error (i.e. violates a policy), an exception may be added to the policy engine 190, to ignore the error when applied to the VM 142. An exception may be implemented as a rule in the policy engine 190. However, as the exception is specific to the VM 142, the staging environment VM 142-S, which is identical to the VM 142, would trigger an error, based on violating the same policy. This can be overcome by representing configuration code objects, objects of the staging environment 140-S, and objects of the production environment 140, all in a security graph 170. An example for such a method is discussed in more detail with respect to FIG. 9 below.

Figure 2:
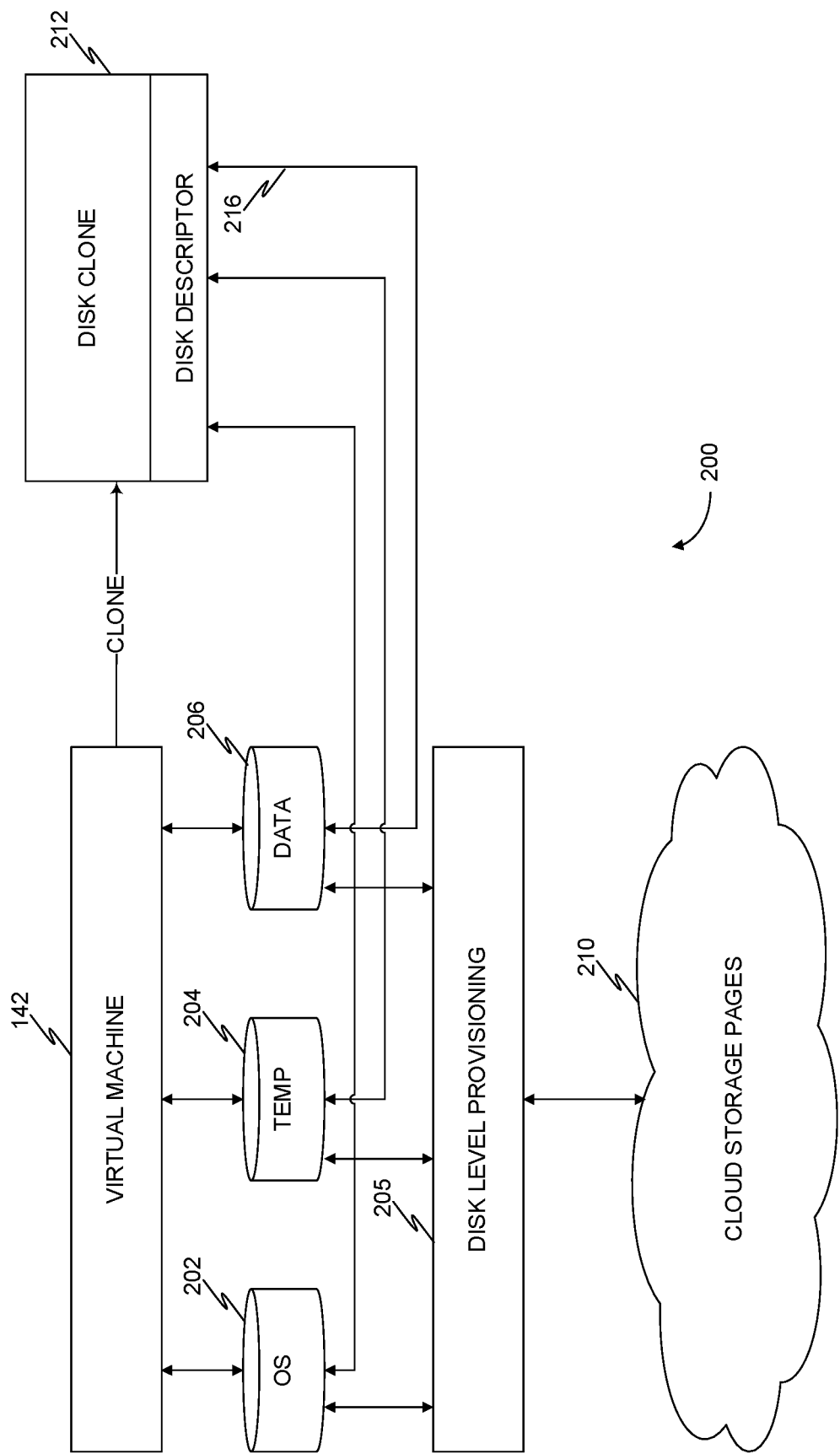
FIG. 2 is an example diagram of a virtual machine and a cloned disk thereof, utilized to describe an embodiment.

FIG. 2 is an example diagram 200 of a virtual machine 142 and a cloned disk thereof, utilized to describe an embodiment. While an Azure® cloud computing infrastructure is discussed here, it should be understood that the teachings herein apply equally to other cloud computing infrastructures which offer equal functionality. The VM 142 includes a plurality of disks allocated to the VM 142. The VM 142 may be deployed only with an OS disk, with an OS disk and a plurality of data disks, and so on.

In this example embodiment the plurality of disks includes an operating system (OS) disk 202, an optional temporary disk 204, and at least a data disk 206. The OS disk 202 includes a preinstalled OS, such as Microsoft® Windows, or Linux®. The preinstalled OS is in a boot volume of the OS disk 202. The optional temporary disk 204 may be used for storing temporary data, such as page files, swap files, and the like. The data disk 206 may be used for storing an application, application code, libraries, binaries, application data, and the like. In an embodiment, a plurality of data disks 206 may be allocated to the VM 142. In some configurations, a disk of the plurality of disks may be encrypted. For example, the OS disk 202, and the data disk 206 may be encrypted disks. In certain embodiments an encrypted disk is associated with an encryption key which can be used to decrypt the disk. For example, a VM having a Windows® allocated disk may be configured to encrypt a data disk allocated to the VM using BitLocker. A VM having a Linux® allocated disk may be configured to encrypt a data disk allocated to the VM using DM-Crypt®.

The plurality of disks are allocated to the VM 142 by a disk level provisioning 205. In an embodiment, the disk level provisioning 205 is an application deployed in a cloud computing infrastructure. The disk level provisioning 205 provisions hardware resource to the VM 142 which results in allocation of a disk. The hardware resources are provisioned from cloud storage pages 210 of the cloud computing infrastructure. The hardware resources may be solid state device (SSD) storage, hard disk drive (HDD) storage, optical storage, other magnetic storage, and the like. In an example embodiment, the cloud storage pages 210 are Azure page blobs. A page blob is a collection of a pages, each page having a predetermined size. For example, the predetermined size may be 512-bytes per page.

A disk clone 212 (also referred to as cloned disk 212) includes a disk descriptor which includes a reference to an address of a disk of the VM 142. In certain cloud computing infrastructures, when a disk is cloned, a pointer, such as pointer 216 is used to point to an original disk, in this example the data disk 206. In an embodiment, this may be achieved by dereferencing a pointer of the VM 142 which points to the data disk 206, and generating the pointer 216 for the cloned VM 212 to point to the data disk 206. In certain embodiments where a disk is encrypted, a pointer may be generated for the cloned VM 212 to the encryption key.

In an embodiment, the cloning process generates the disk clone 212 as a background process. This is possible due to utilizing diffs. A diff is an additional content that includes the difference between a content at one point in time (e.g., when the original disk was cloned) and a second, later, point in time. Thus, the VM 142 may access the data disk 206 and any diffs generated, or committed, after the disk clone 212 is generated, whereas the disk clone 212 may access only the content of the original data disk 206, and cannot access any diffs generated since.

The cloned disk 212 may then be inspected by an inspector, such as the inspector 160 of the inspection environment 150 of FIG. 1 above. In some embodiments, a cloud computing infrastructure may be divided into regions, corresponding to geographic regions. In such embodiments, cloning a disk may be possible only if the disk clone is in the same region as the original disk from which the clone is generated. In an embodiment an inspection controller is configured to determine if inspecting a virtual instance requires generating a disk clone or a snapshot. In an embodiment, the determination is performed based on the geographic location of the VM 142, an intended geographic location into which a disk of the VM 142 is cloned, a geographic location of the inspection environment, a number of disks allocated to the virtual instance, or any combination thereof.

By inspecting a cloned disk 212 there is no need to generate a snapshot, which prevents at least some of the deficiencies noted above. Furthermore, cloning is performed on a live virtual instance, which remains live during inspection, as the cloning does not interfere with the virtual instance's operation. Once inspection of the cloned disk 212 is complete, the cloned disk 212 may be spun down, releasing any resources allocated to it, and removing the pointers pointing to the disks of the virtual machine. In an embodiment, the cloned disk 212 may be deleted to accomplish spinning down.

Figure 3:
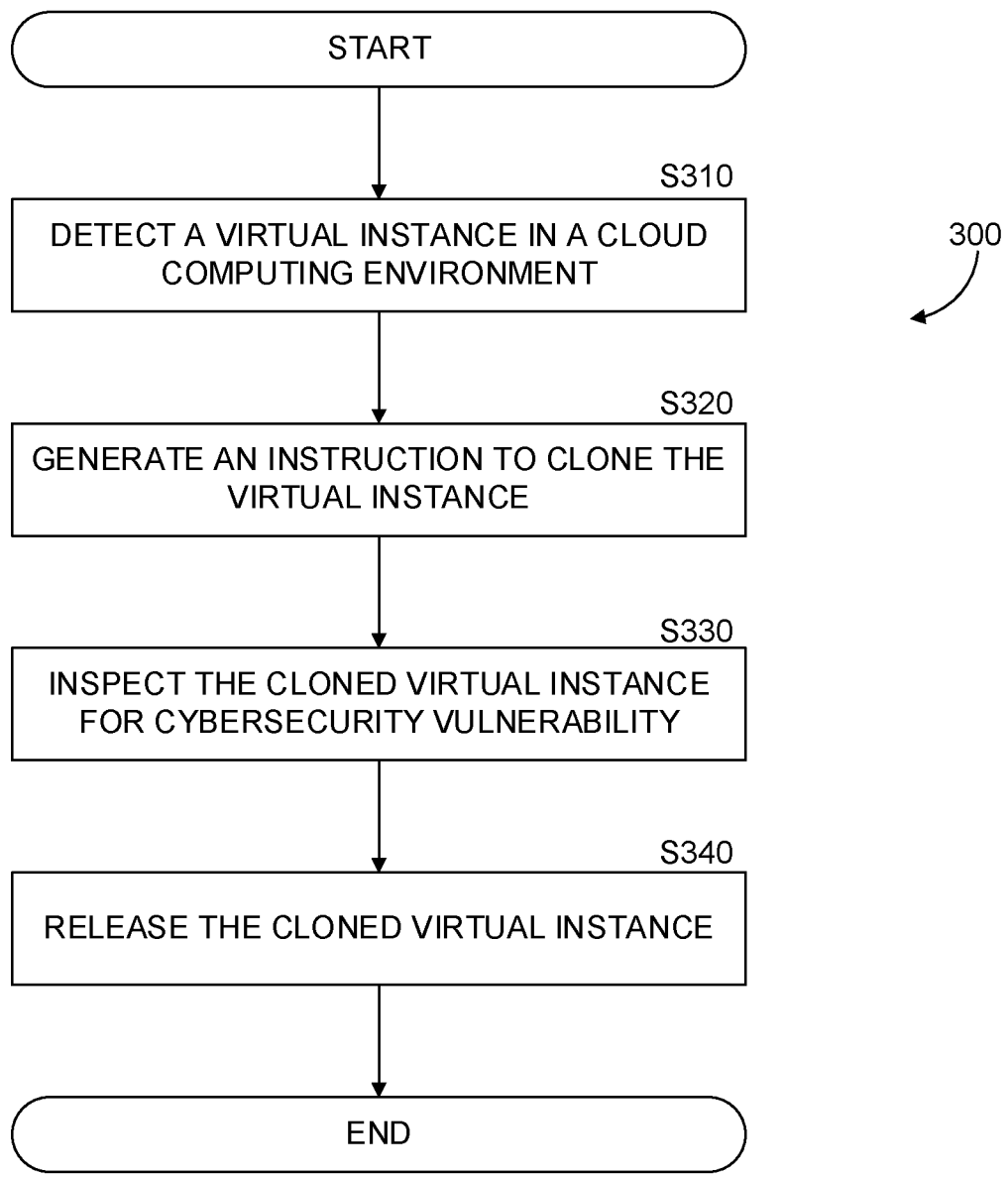
FIG. 3 is an example flowchart of a method for generating a disk clone of a virtual instance for vulnerability inspection according to an embodiment.

FIG. 3 is an example flowchart 300 of a method for generating a disk clone of a virtual instance for vulnerability inspection according to an embodiment.

At S310, a live virtual instance is detected in a cloud computing environment. A live virtual instance is a virtual instance which, at the time of detection, is deployed in a production environment. A production environment is a cloud computing environment which provides services and resources, for example, to users of the cloud computing environment. This is an environment which is distinct, for example, from a test environment in which applications, appliances, code, and the like, are tested, before being deployed in a production environment for general use.

In an embodiment, an application programming interface (API) of a cloud computing environment may be queried to detect virtual instances deployed therein. In other embodiments, a security graph may be queried to detect virtual instances deployed in the cloud computing environments. The security graph, which includes a representation of the cloud computing environment, may be queried to detect virtual instances based on at least an attribute. The at least an attribute may be, for example, a type of virtual instance (e.g., virtual machine, container, etc.), a region in which the virtual instance is deployed, a tag indicating that the virtual instance should be inspected, and the like.

In an embodiment, detecting a virtual instance further includes determining an identifier of the virtual instance, such as a name, network address, and the like. The identifier may be used to access the virtual instance. The virtual instance includes a disk (also referred to as original disk). In some embodiments, the disk is represented as a node in the security graph, the node connected to another node, the another node representing the virtual instance.

In certain embodiments, detecting a live virtual instance includes receiving an identifier of the live virtual instance, and an instruction to inspect the live virtual instance.

At S320, an instruction is generated which, when executed, configures the cloud computing environment to clone the disk of the virtual instance. In an embodiment, the instruction is generated for execution by an orchestrator of the cloud computing environment in which the virtual instance, also called a parent virtual instance, is deployed. When executed, the instruction configures, for example, the cloud computing environment, to allocate resources to a cloned disk. The cloned disk is an independent copy of the original disk of the parent virtual instance. An independent copy of a disk is a copy which can be deployed and accessed independently of the original disk. This is as opposed to a copy of a virtual instance, such as a snapshot, which requires additional resources allocated in order to deploy.

For example, a snapshot may be generated based off of a single disk of a virtual instance. A new disk (e.g., persistent volume) may be generated based off of the snapshot, and a claim (e.g., persistent volume claim) generated to another virtual instance in order to access data stored on the new disk. Furthermore, a snapshot is only available once the disk is completely copied. In contrast, a clone is available immediately as the operation of generating a disk descriptor is faster than an operation of generating a snapshot. For at least this reason inspection is completed faster.

In certain embodiments, the instruction, when executed, configures the cloud computing environment to generate a cloned disk having a reference, such as a pointer, to the original disk of the parent virtual instance. In some embodiments, the disk is encrypted with an encryption key. The encryption key, as well as the disk, may be dereferenced. Dereferencing an encryption key (or a disk) may include determining where a pointer of the parent virtual instance is pointing to, e.g., the pointer points to a block address of a managed block storage. A new pointer may be stored for the cloned disk which points to the same block address, encryption key, etc. as the dereferenced pointer.

In some embodiments, an optional check is performed to determine if the cloned disk is configured to be deployed in a same region as the parent virtual instance. A cloud computing infrastructure may limit the ability to clone a disk outside of a region. For example, if an inspection environment is not in the same region as the cloud computing environment in which the virtual instance is inspected, it may not be possible (i.e., not permissible) to generate a disk clone in the region where the inspection environment is.

In other embodiments, an optional check may be performed to determine the number of disks associated with a virtual instance. For example, if the number of disks equals or exceeds a predetermined threshold the cloning process may be initiated, otherwise a snapshot is generated, and inspection is performed on the generated snapshot.

At S330, the cloned disk is inspected for cybersecurity threats. In an embodiment, cybersecurity threats include, but are not limited to, exposures, vulnerabilities, malware, ransomware, spyware, bots, weak passwords, exposed passwords, exposed certificates, outdated certificates, misconfigurations, suspicious events, and the like.

Inspecting a cloned disk includes, in an embodiment, assigning an inspector to the cloned disk. In some embodiments, an inspector, such as inspector 124 of FIG. 1, is provided with access to the cloned disk. For example, the cloning process may include generating an instruction which when executed configures the cloned disk to allow an inspector workload access thereto. The inspector may inspect the cloned disk for security objects, such as files, folders, and the like. A security object may be, for example, a password stored in plaintext, a password stored in cleartext, a certificate, and the like.

For example, in an embodiment, a signature for a file, folder, and the like is generated during an inspection. Such a signature is matched to another known signature. The known signature indicates a vulnerability. A signature may be generated, for example, using a checksum.

At S340, the cloned disk is released. In an embodiment, an instruction may be generated which, when executed, configures the cloud computing environment to release the cloned disk. Releasing a cloned disk may include, for example, deprovisioning resources allocated to the cloned disk. For example, a cloned disk may be deleted. Releasing the cloned disk is performed in response to completing the inspection.

While virtual machines are discussed throughout this disclosure, it should be understood that the teachings herein apply equally to other virtual instances with respect to cloning and snapshot generation.

Figure 4:
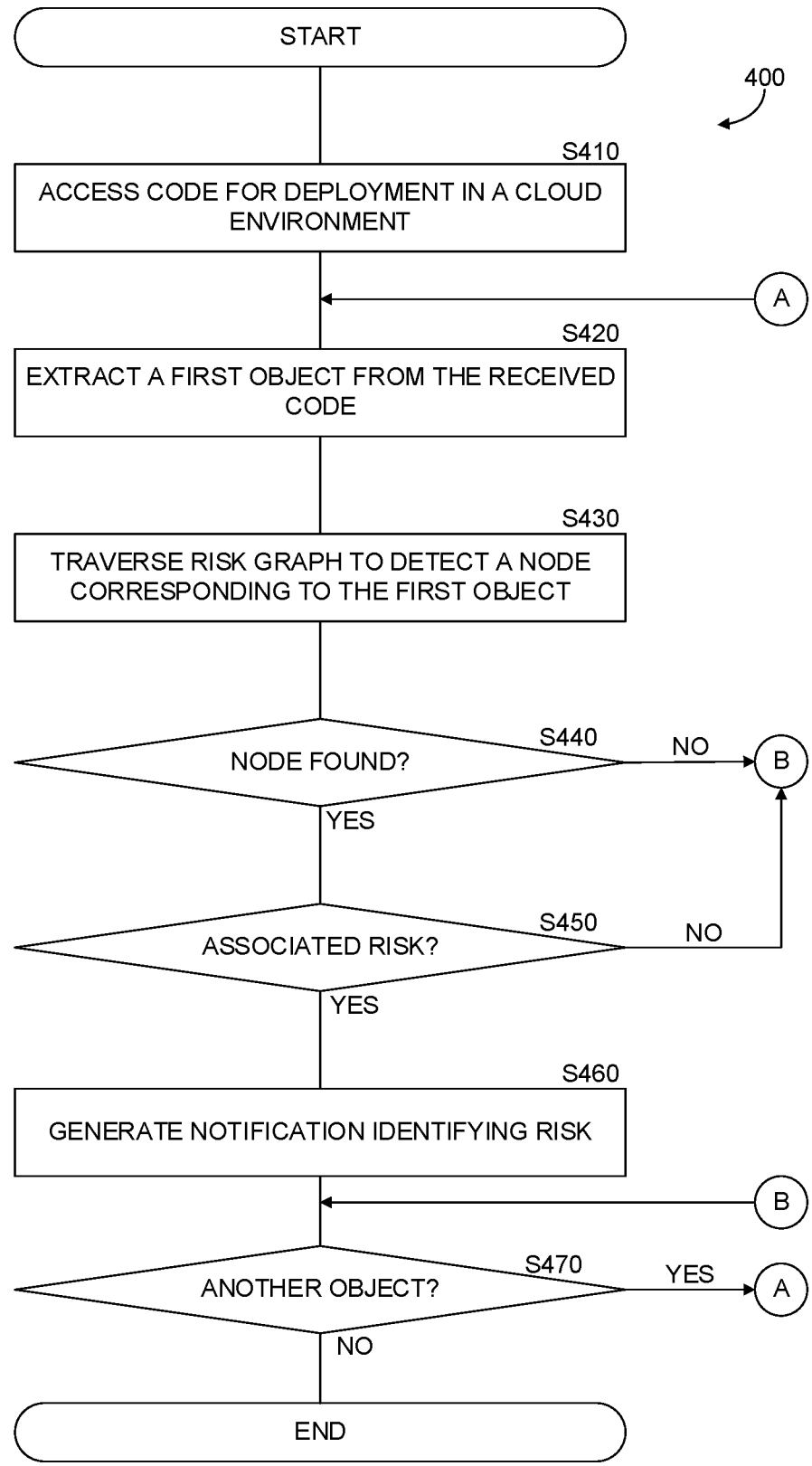
FIG. 4 is an example flowchart of a method for inspecting configuration code based on a security graph, implemented in accordance with an embodiment.

FIG. 4 is an example flowchart 400 of a method for inspecting configuration code based on a security graph, implemented in accordance with an embodiment. The method provides the ability to inspect configuration code in a development (dev) environment based on a security graph which is generated at least in part based on a production environment. The production environment is rarely, if at all, identical to the environment which is deployed initially by code. This is due to, for example, upgrades and patches implemented in the production environment. As production teams and dev teams are usually not the same, there is a phenomenon known as configuration drift, which describes how the production environment, over time, 'drifts' further away from the initial configuration code design.

The security graph may be generated based both off of the code and the production environment. By inspecting the configuration code based on a security graph generated from data from the production environment, insight can be gained and deployment issues may be caught early on, for example to identify instances which if deployed based on a current version of configuration code would include a version of software which the production environment has already upgraded to a newer version. The method may be performed by a configuration code inspector, such as the code inspector 180.

At S410, configuration code is received by, for example, a configuration code inspector. The configuration code includes a plurality of code objects, at least a portion of which correspond to instances which are intended to be deployed in a cloud computing environment. The configuration code may be scanned or otherwise inspected as a textual object, meaning it can be searched for regular expressions (regex), strings, and the like.

At S420, a first code object is extracted from the received code. Extracting a code object may include, for example, searching the text of a configuration code file for one or more predetermined strings. For example, a code object may be a text field identifying a type of workload, a name of a workload, a network address, a name in a namespace, a role, a permission, and the like.

At S430, a security graph is traversed to detect if a node in the graph corresponds to the extracted first object. Traversing the security graph may include, for example, sending a request through an API of a graph database hosting the security graph to search the graph for a string or value corresponding to the first object. For example, if the first object is a secret, such as a private key, the security graph may be traversed to determine if there is a node which represents the matching public key. In some embodiments, a query directed at the security graph may include a plurality of clauses, for example, to search for container nodes which are attached to a node which represents the public key. It is worth noting that detecting a node which corresponds to the extracted first object may include nodes which are not a node representing a workload corresponding to the first object.

For example, executing code of the first object may result in deploying a first load balancer in a virtual private cloud (VPC). Once the first load balancer is deployed, a node may be generated in a security graph to represent the first load balancer and would be connected to a node representing the VPC. An advantage of the disclosed method is that attributes of the first object may be detected in the graph, which allows to detect nodes prior to the generation of the actual workload. In other words, a security risk may be detected in a workload prior to it being deployed. In this example, as the code of the first object includes instructions to deploy in the VPC, the VPC node may be detected, and from there an assessment may be made regarding security risks which are associated with the VPC, or with deploying a load balancer in the VPC.

At S440, a check is performed to determine if a node is detected. If 'no' execution may continue at S470. In an embodiment, if a match does not exist, a new node may be generated in the security graph to represent the first object. If a match exists execution continues to S450.

At S450, a check is performed to determine if the matched node corresponds to a previously determined risk factor, or vulnerability. A risk factor, or vulnerability, may be, for example, access to/from a network resource (such as the internet), outdated software, privilege escalation, and the like. A risk factor score may be further determined in some embodiments. The score may indicate the severity of the risk, such as 'low', 'medium', 'high', and 'critical'. In an embodiment, different instructions may be executed based on the risk factor score. The risk factor may be indicated by metadata associated with the matched node. The metadata may be, for example, data fields which indicate that a risk factor is present. For example, a flag may indicate if a node has external network access. If the matched node corresponds to a previously determined risk factor execution continues at S460, otherwise execution continues at S470. In an embodiment a vulnerability may be represented on the security graph by a node. As an example, a node corresponding to a workload may be connected to a vulnerability node. Therefore, if the workload node is the matched node, then a security vulnerability may be associated with the code object.

At optional S460 a notification may be generated to indicate that a security risk has been detected in the configuration code. In an embodiment the notification may be generated and sent to the client device, user account(s), or both, which authored the code. In some embodiments, the notification may include an indicator to specify why the notification is generated, and what should be performed to mitigate the risk. In the example above, an alert (notification) would be generated if workload includes an outdated software version, and the alert would include the current version, which would need to be configured in the code so as to pass the check.

At S470 a check is performed to determine if another code object should be inspected. If 'yes' execution continues at S420, otherwise execution terminates.

Figure 5:
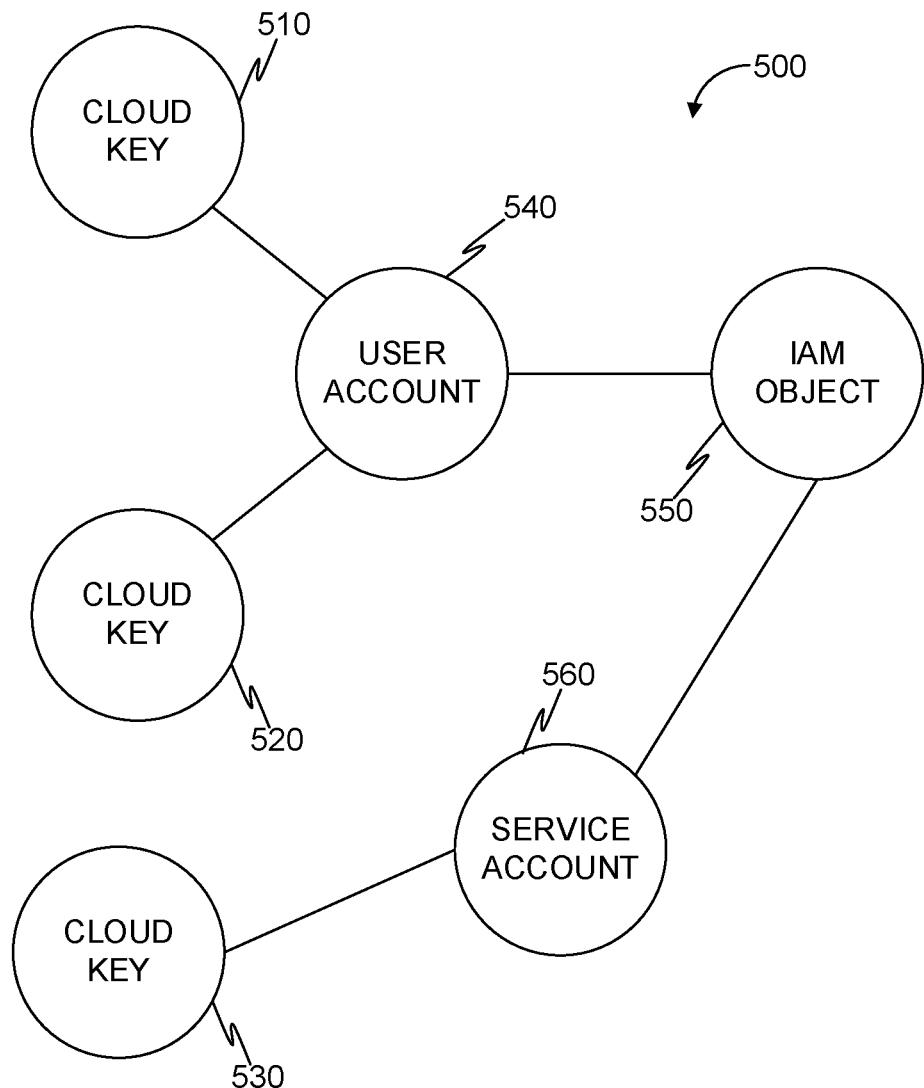
FIG. 5 is a schematic illustration of a portion of a security graph for risk assessment of instances in a cloud based computing environment, implemented in accordance with an embodiment.

FIG. 5 is a schematic illustration of a portion of a security graph 500 for risk assessment of instances in a cloud based computing environment, implemented in accordance with an embodiment. The graph 500, which may be stored in a graph database, includes a plurality of nodes. A node may represent a resource, principal, metadata, enrichment data, and the like. In an embodiment, data for generating the representation of the security graph 500 is received from an inspector.

In this example, the graph includes a first cloud key node 510 and a second cloud key node 520, which are connected to a user account node 540. A third cloud key node 530 is connected to a service account node 560. The user account node 540 and service account node 560 are connected to an identity and access management (IAM) object node 550.

A cloud key may provide temporary or permanent access between a first workload and a second workload. In some embodiments, one or more first workloads and one or more second workloads may be on the same tenant, on different tenants, or on a combination thereof. Cloud keys may be embedded into text configuration files, structured configuration files (e.g., JSON, YAML, XML, etc.), scripts, source code, and the like. Example implementations of cloud keys include AWS IAM access keys, OAuth refresh tokens, access tokens, and the like.

By generating a graph including such nodes and populating it with data based on the cloud based computing environment, it is possible to assess security risks. For example, if a first cloud key is compromised, it is readily apparent what other objects are vulnerable as a result. In an embodiment each node may further store metadata and data relating to the object. For example, a cloud key node 520 may include therein a unique account identifier.

FIG. 6 is an example of a code object, shown in accordance with an embodiment. A code object 600 includes an object type 610. The object type 610 indicates, in this example, that this code object is a resource type, i.e. executing instructions related to this object will deploy a resource in a cloud computing environment. The object type further includes data fields, such as instance type data field 612 and network association data field 614.

The instance type 612 specifies what type of resource is to be deployed, in this case the instance type is a t2.micro, which is a processing instance used in the AWS cloud computing environment. The network association field 614 indicates, in this example, that the instance should be associated with a specific virtual private cloud (VPC). In this example the code object is a data structure having parameters (or data fields) which can be customized to generate resources, accounts, and the like, in a cloud computing environment.

In an embodiment, the code object 600 corresponds to a workload which is deployed in a computing environment based on the code object 600.

Figure 7:
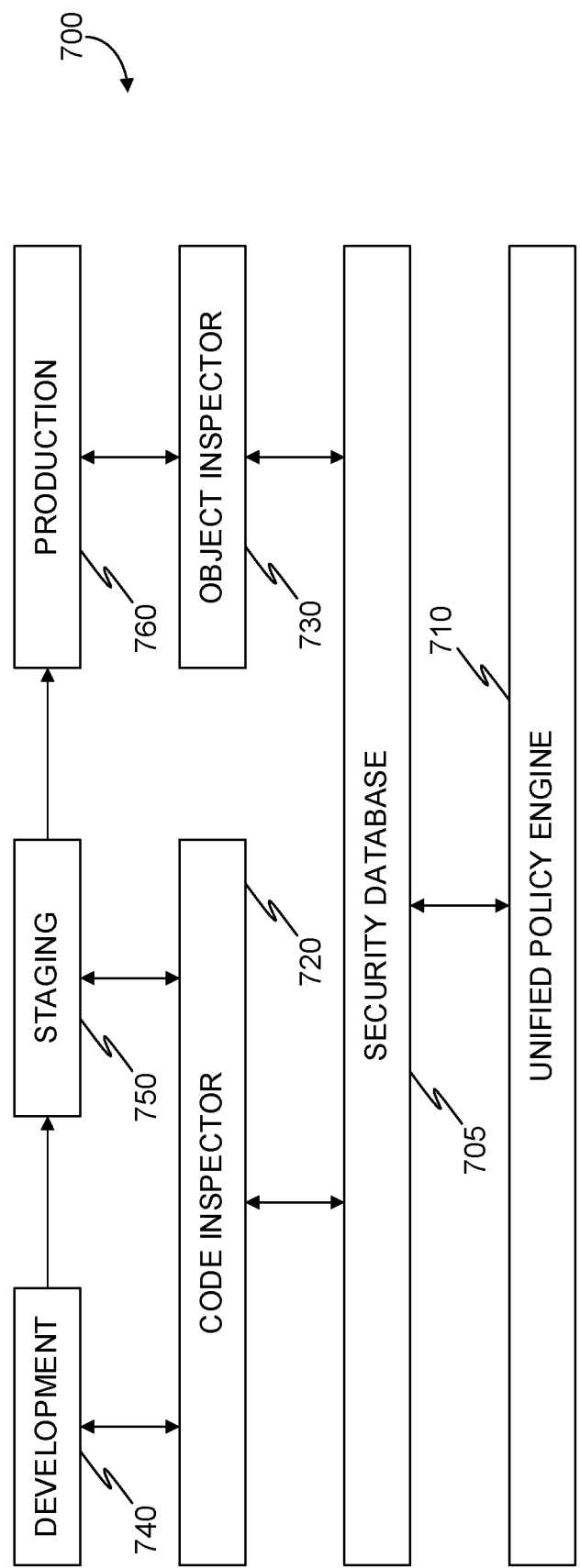
FIG. 7 is an example of a schematic illustration of a unified policy engine across multiple cloud environments, implemented according to an embodiment.

FIG. 7 is an example of a schematic illustration 700 of a unified policy engine across multiple cloud environments, implemented according to an embodiment. A unified policy engine 710 is a policy engine which can be utilized across a full technology stack. A production cycle typically begins in a development environment 740. The development environment may include sandboxed applications, infrastructure as code (IaC) declaratory code (such as configuration code 120 of FIG. 1), and the like. For example, Microsoft® Azure offers Azure DevOps Services which may serve as a cloud based development environment.

After a workload, policy, or other change in infrastructure is approved from the development environment 740, it is implemented in a staging environment 750. For example, a workload is deployed in the staging environment 750, policy change is updated into a policy engine of the staging environment 750, and the like. A staging environment 750 may be implemented as a cloud computing environment which is identical, or similar, to a production environment in which the workload or change is ultimately deployed. The purpose of a staging environment 650 is to provide a testing environment which simulates the production environment to a high degree. This allows to eventually deploy a workload, for example, with a relatively high certainty that the workload will perform as expected. Where a workload does not perform as expected, it may be returned to the development environment 740, in order to address any problems which were detected during deployment in the staging environment 750.

A workload which passes testing of the staging environment 750 may be implemented in a production environment 760. The production environment is a cloud computing environment which is in real time use.

In an example embodiment, a code object may be written as code in a configuration code file, stored in the development environment 740. The configuration code file may then be executed, for example by Terraform®, to deploy a workload (or user account, as another example) based on the code object in the staging environment 750. The deployed workload may be tested in the staging environment 750, for example by executing performance tests, load tests, and the like. If the deployed workload passes the tests in the staging environment 750, the code object may be added to a main configuration code file (or committed, per industry term).

The next time the main configuration code file is utilized, the code object will be used to deploy instances in the production environment 760.

Inspectors may be utilized to inspect various objects across different compute environments. For example, a code inspector 720 is configured to inspect for a code object (e.g., a cybersecurity object) in each of the development 740 and staging 750 environments. As another example, an object inspector 730 is configured to inspect for cybersecurity objects in the production environment 760. While this embodiment shows inspector workloads operating in different environments, this is merely for simplicity and pedagogical purposes.

In certain embodiments a first inspector, inspecting for a first object type, may inspect each cloud environment for the first object type. In other embodiments, an inspector for the first object type may be implemented for each compute environment. In some embodiments an inspector may inspect for an object having a data field, attribute, or other value configured to a predetermined value.

Typically, system administrators will make changes to a production environment policy in response to detecting a real-world event (as opposed to theoretical test cases done in staging). For example, in response to detecting a vulnerability, a system administrator may update, or create, a policy to address the vulnerability. The policy is stored in a cloud environment of the production environment 760, which is not accessible to the staging environment 750, and typically not readable by the development environment 740. Further, there is no way for an operator of the development environment 740 or staging environment 750 to know about the policy change. Therefore, operators of the development environment 740 and staging environment 750 may continue to create workloads which violate the policies set forth in the production environment 760.

By utilizing the inspector workloads across all the compute environments, and representing the detected objects in a security database 705, a unified policy engine 710 may be utilized, which can be used to implement a policy across all the compute environments. In this example, a code object may be detected in the development environment 740. The code object is inspected and the content of the code object (e.g. identifier, type, etc.) may be matched to a node of the security database 705. The node may be associated with a policy which is accessible to the unified policy engine 710. A check may be performed to determine if an instance generated based on the detected code object would comply with the associated policy. Thus, a code object can be failed at the development environment 740 based on a policy of the production environment 760, without wasting resources and time of going through staging, for example.

Figure 8:
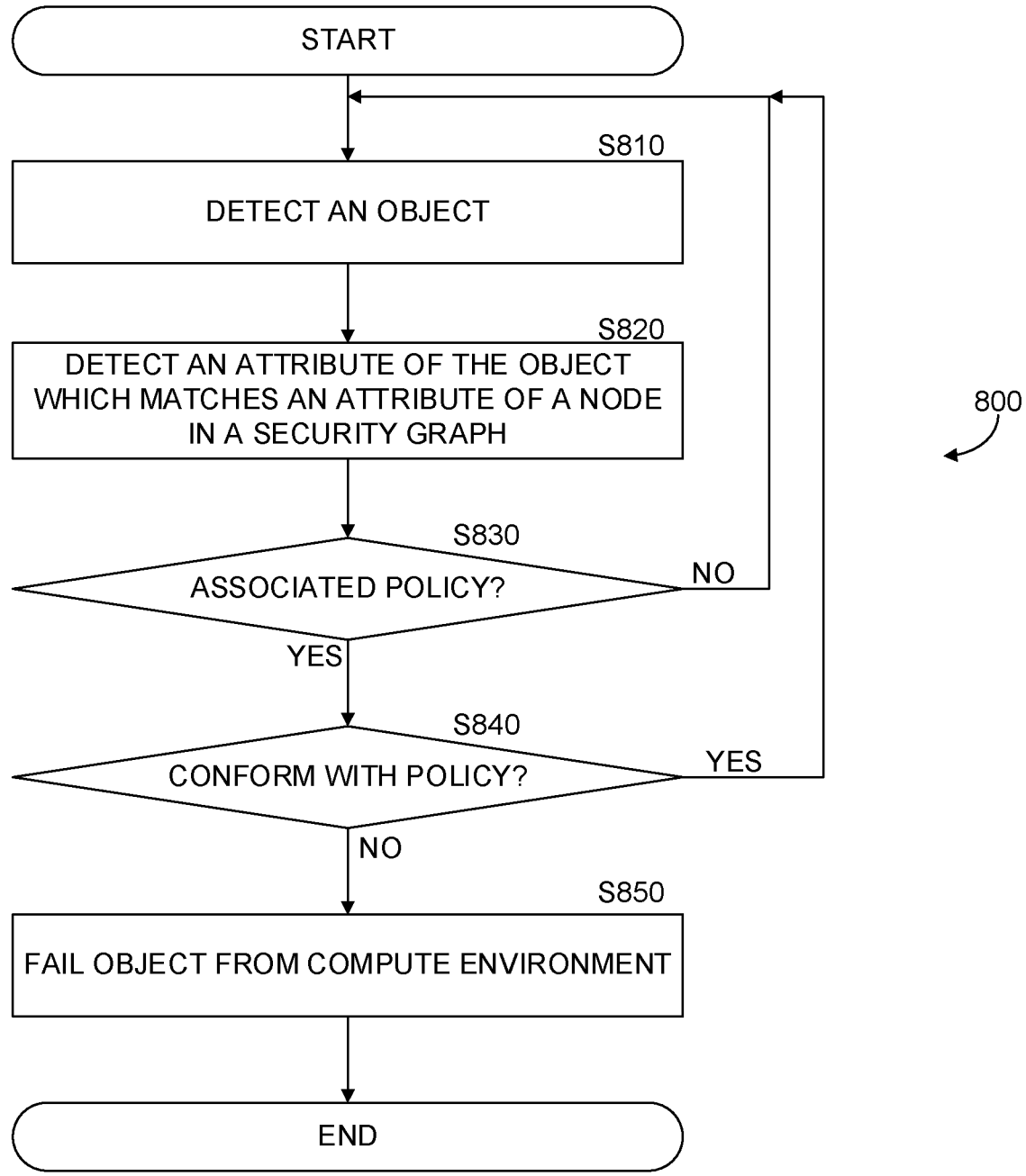
FIG. 8 is an example of a flowchart for implementing a unified policy across a deployment technology stack, implemented in accordance with an embodiment.

FIG. 8 is an example of a flowchart for implementing a unified policy across a deployment technology stack, implemented in accordance with an embodiment.

At S810, an object is detected. In an embodiment, the object is a code object, detected by an inspector which is configured to detect at least a first object type. In another embodiment, the object is a workload, virtual machine, container, serverless function, secret, private key, public key, user account, service account, role, and the like. The object may be detected in a configuration code file of an IaC code, or in a compute environment, such as a staging environment. The object includes at least an attribute. An attribute may be a network association, network address, identifier, type, name, and the like.

At S820, an attribute of the object is detected, which corresponds with a node of a security graph, wherein the security graph represents at least a production environment. The security graph may further access a policy engine, which includes policies and rules which are implemented with respect to workloads, accounts, and the like, in the production environment.

At S830, a check is performed to determine if a policy is associated with the node of the security graph. A policy may be associated with a node of a security graph based, for example, on a data field, an attribute, or other data associated with the node, which matches a condition of a policy. If 'yes' execution continues at S840. If 'no' execution may continue at S810, or in another embodiment, execution may terminate.

At S840, a check is performed to determine if the object conforms with the associated policy. For example, for a code object the check may include determining if a workload deployed based on the code object would violate the policy. In some embodiments, a check may be performed to determine if a workload deployed based on the code object would violate any policy in the policy engine. If 'no' execution continues at S850. If 'yes' execution may continue at S810, or in another embodiment, execution may terminate.

At S850, an alert is generated to indicate that the object fails a policy check. In an embodiment, generating the alert may further include generating instructions that when executed by a compute environment prevent the object from deployment in the compute environment, prevent deployment in another environment, or a combination thereof.

In an embodiment, a mitigation action is initiated in response to the object failing a policy check. In some embodiments, a mitigation action includes a remediation action. For example, according to an embodiment, a remediation action includes revoking access to a principal, revoking access from a principal, revoking access to a resource, revoking access from a resource, sandboxing a resource, quarantining a code object, generating an alert, updating an alert, generating a severity of an alert, updating a severity of an alert, a combination thereof, and the like.

Figure 9:
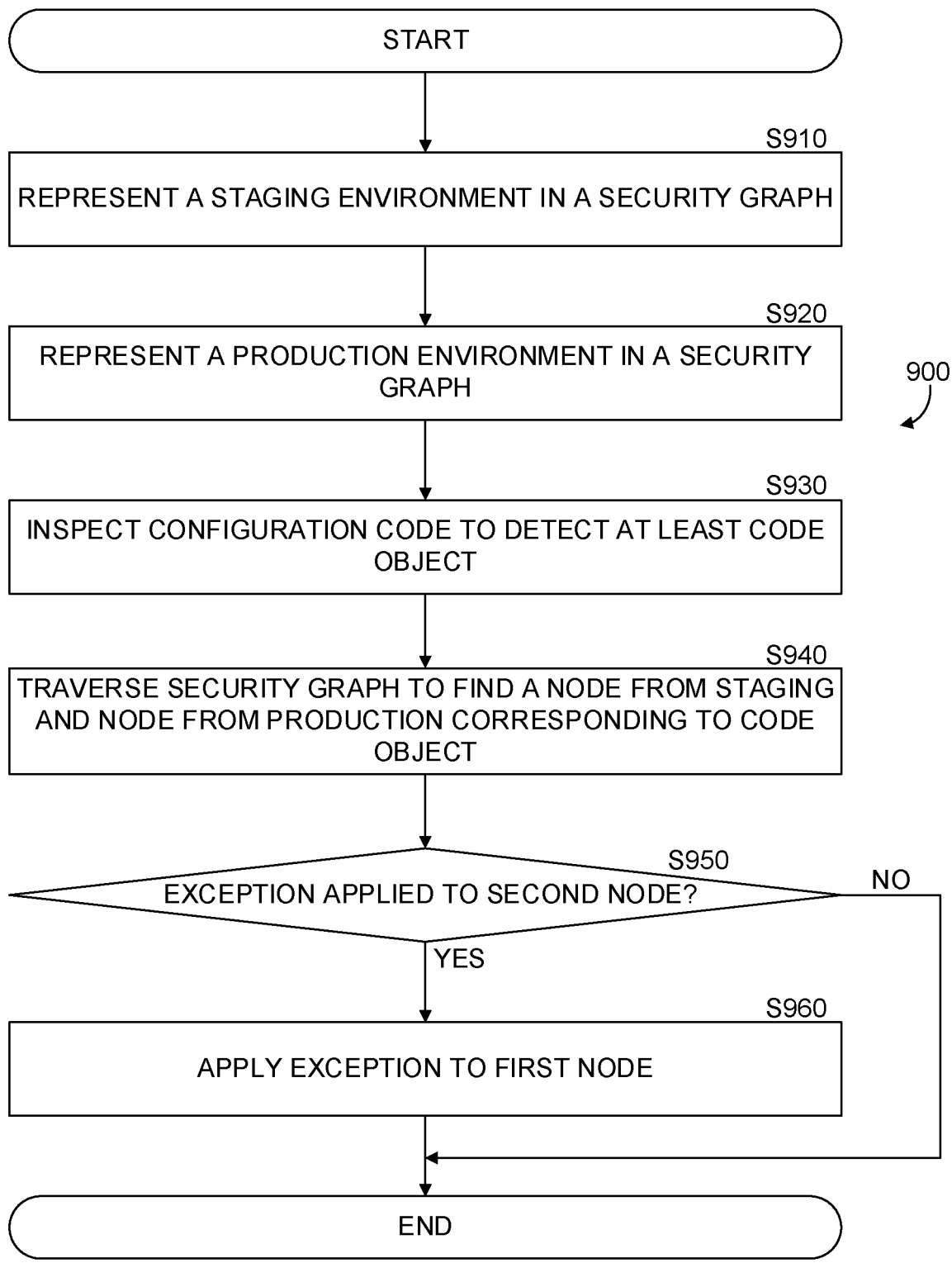
FIG. 9 is an example flowchart of a method for applying policies to counterpart workloads in different cloud environments, implemented in accordance with an embodiment.

FIG. 9 is an example flowchart of a method for applying policies to counterpart workloads in different cloud environments, implemented in accordance with an embodiment. Workloads are considered counterparts if a first workload is deployed in a staging cloud environment and a second workload, identical to the first workload, is deployed in a production cloud environment. Counterpart workloads may both be generated from the same code object of a configuration code file.

At S910, a staging cloud environment is represented in a security graph. Representing a staging cloud environment in a security graph may include detecting objects, such as resources and principals, policies, rules, etc. and generating nodes which correspond to the detected objects. A resource may be a workload, such as a virtual machine, container, serverless function, and the like. A principal acts on a resource, and may be, for example, a role, user account, service account, and the like. Connections between resources and principals may be represented by vertices, which are generated for example based on a policy. For example, a vertex may indicate that a first principal can access a first resource, based on a policy stating that any principal having a predetermined role may access the first resource. In certain embodiments a node may further include an indicator, stored as data of the node, which indicates that the node represents a resource (or principal) of the staging environment.

At S920, a production cloud environment is represented in the security graph. Representation of the cloud environment may be performed as described above for the staging cloud environment. In an embodiment, certain objects may be present in the staging environment, which are not present in the production environment. For example, the VM 143-S of FIG. 1 above is present in the staging environment (and therefore represented in the security graph), but a counterpart to VM 143-S is not present in the production cloud environment. In certain embodiments a node in the security graph may further include an indicator, stored as data of the node, which indicates that the node represents a principal (or resource) of the production environment.

At S930, configuration code is inspected to detect at least a code object. A code object describes a resource or principal which is deployed in a cloud computing environment. An example code object is presented in FIG. 5 above.

At S940, the security graph is traversed to find a first node from the staging environment, and a second node from the production environment, which correspond to the detected at least a code object. In an embodiment, the security graph may be configured to generate a vertex connecting the first node to the second node, to indicate that they are corresponding nodes from different compute environments.

At S950, a check is performed to determine if an exception rule is applied to the second node. If 'yes' execution continues with S960. If 'no' execution may terminate, or in another embodiment, execution may continue at S930 to detect another code object. In an embodiment a policy engine may be queried to determine if the policy engine stores an exception rule which is based on an object (e.g. resource or principal), which corresponds to the second node.

At S960, the exception rule is applied to the first node. By applying the exception rule to the first node the amount of redundant errors presented to a user of the rule engine or security graph is decreased. The error is redundant in this case as it is clear to a user that corresponding workloads should all be excepted if a single one of them is. While a single staging environment and a single production environment are discussed in the example above, it should be readily apparent to those skilled in the art that multiple staging environments and multiple production environments may be utilized according to the teachings herein.

Figure 10:
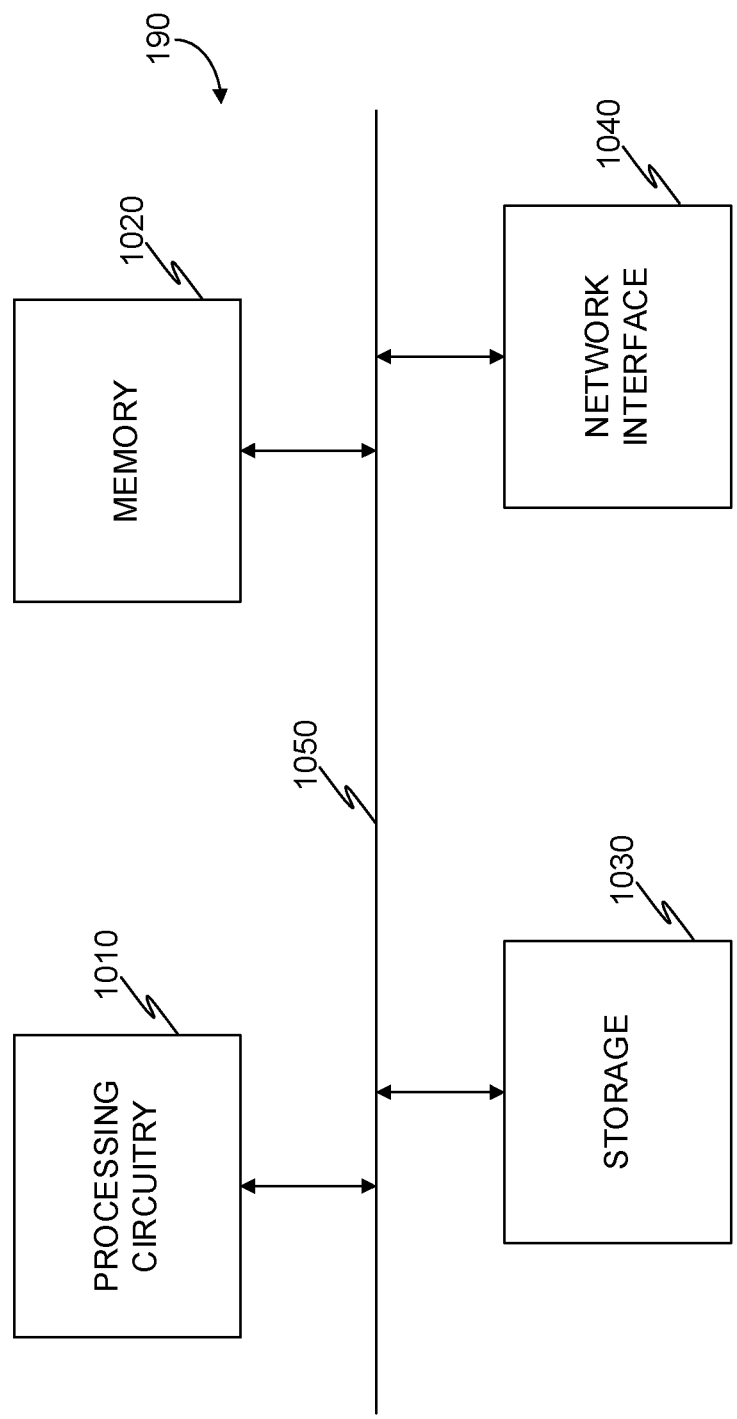
FIG. 10 is an example schematic diagram of a policy engine according to an embodiment.

FIG. 10 is an example schematic diagram of a policy engine 190 according to an embodiment. The policy engine 190 includes, according to an embodiment, a processing circuitry 1010 coupled to a memory 1020, a storage 1030, and a network interface 1040. In an embodiment, the components of the policy engine 190 are communicatively connected via a bus 1050.

In certain embodiments, the processing circuitry 1010 is realized as one or more hardware logic components and circuits. For example, according to an embodiment, illustrative types of hardware logic components include field programmable gate arrays (FPGAs), application-specific integrated circuits (ASICs), Application-specific standard products (ASSPs), system-on-a-chip systems (SOCs), graphics processing units (GPUs), tensor processing units (TPUs), Artificial Intelligence (AI) accelerators, general-purpose microprocessors, microcontrollers, digital signal processors (DSPs), and the like, or any other hardware logic components that are configured to perform calculations or other manipulations of information.

In an embodiment, the memory 1020 is a volatile memory (e.g., random access memory, etc.), a non-volatile memory (e.g., read only memory, flash memory, etc.), a combination thereof, and the like. In some embodiments, the memory 1020 is an on-chip memory, an off-chip memory, a combination thereof, and the like. In certain embodiments, the memory 1020 is a scratch-pad memory for the processing circuitry 1010.

In one configuration, software for implementing one or more embodiments disclosed herein is stored in the storage 1030, in the memory 1020, in a combination thereof, and the like. Software shall be construed broadly to mean any type of instructions, whether referred to as software, firmware, middleware, microcode, hardware description language, or otherwise. Instructions include, according to an embodiment, code (e.g., in source code format, binary code format, executable code format, or any other suitable format of code). The instructions, when executed by the processing circuitry 1010, cause the processing circuitry 1010 to perform the various processes described herein, in accordance with an embodiment.

In some embodiments, the storage 1030 is a magnetic storage, an optical storage, a solid-state storage, a combination thereof, and the like, and is realized, according to an embodiment, as a flash memory, as a hard-disk drive, another memory technology, various combinations thereof, or any other medium which can be used to store the desired information.

The network interface 1040 is configured to provide the policy engine 190 with communication with, for example, the security database 170, the inspector 160, the code inspector 180, and the like, according to an embodiment.

It should be understood that the embodiments described herein are not limited to the specific architecture illustrated in FIG. 10, and other architectures may be equally used without departing from the scope of the disclosed embodiments.

Furthermore, in certain embodiments the security database 170, the inspector 160, the code inspector 180, and the like, may be implemented with the architecture illustrated in FIG. 10. In other embodiments, other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more processing units ("PUs"), a memory, and input/output interfaces. The computer platform may also include an operating system and microinstruction code. The various processes and functions described herein may be either part of the microinstruction code or part of the application program, or any combination thereof, which may be executed by a PU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for applying cybersecurity policies across multiple computing environments, comprising:
generating an inspectable disk from a disk of a first workload deployed in a first computing environment, the computing environment including a cybersecurity policy applicable to a cybersecurity object;
detecting the cybersecurity object on the inspectable disk;
generating a policy exception based on the cybersecurity object and the first workload;
generating a representation of the cybersecurity object and the first workload in a security database, wherein the security database includes a representation of the first computing environment and a representation of a second computing environment which is associated with the first computing environment;
detecting in the representation of the second computing environment a representation of a second workload associated with the representation of the first workload;
applying the policy exception to the second workload based on detecting that the second workload is associated with the first workload;
traversing a security graph to find a first node representing the first workload, wherein the security graph is the representation in the security database; and
traversing the security graph to find a second node representing the second workload.

2. The method of claim 1, further comprising:
detecting a first code object in a configuration code file, the configuration code file including a plurality of code objects;
determining that the first workload is deployed based on the first code object; and
applying the generated exception to the first code object.

3. The method of claim 1, wherein generating the inspectable disk further comprises:
cloning the disk of the workload into a cloned disk.

4. The method of claim 1, further comprising:
releasing the inspectable disk in response to determining that inspection is complete.

5. The method of claim 1, further comprising:
detecting a second cybersecurity object, the second cybersecurity object failing a policy of the first computing environment; and
failing the first workload, in response to detecting the second cybersecurity object.

6. The method of claim 1, further comprising:
detecting in the representation a representation of a first object, the first object deployed in the first computing environment;
detecting in the representation a representation of a second object, the second object deployed in the second computing environment;
detecting in the representation a connection between the representation of the first object and the representation of the second object; and
applying a policy of the first computing environment to the first object and the second object in response to detecting the connection.

7. A non-transitory computer-readable medium storing a set of instructions for applying cybersecurity policies across multiple computing environments, the set of instructions comprising:
one or more instructions that, when executed by one or more processors of a device, cause the device to:
generate an inspectable disk from a disk of a first workload deployed in a first computing environment, the computing environment including a cybersecurity policy applicable to a cybersecurity object;
detect the cybersecurity object on the inspectable disk;
generate a policy exception based on the cybersecurity object and the first workload;
generate a representation of the cybersecurity object and the first workload in a security database, wherein the security database includes a representation of the first computing environment and a representation of a second computing environment which is associated with the first computing environment;
detect in the representation of the second computing environment a representation of a second workload associated with the representation of the first workload; and
apply the policy exception to the second workload based on detecting that the second workload is associated with the first workload;
traverse a security graph to find a first node representing the first workload, wherein the security graph is the representation in the security database; and
traverse the security graph to find a second node representing the second workload.

8. A system for applying cybersecurity policies across multiple computing environments comprising:
a processing circuitry;
a memory, the memory containing instructions that, when executed by the processing circuitry, configure the system to:
generate an inspectable disk from a disk of a first workload deployed in a first computing environment, the computing environment including a cybersecurity policy applicable to a cybersecurity object;
detect the cybersecurity object on the inspectable disk;
generate a policy exception based on the cybersecurity object and the first workload;
generate a representation of the cybersecurity object and the first workload in a security database, wherein the security database includes a representation of the first computing environment and a representation of a second computing environment which is associated with the first computing environment;

detect in the representation of the second computing environment a representation of a second workload associated with the representation of the first workload; and apply the policy exception to the second workload based on detecting that the second workload is associated with the first workload;

traverse a security graph to find a first node representing the first workload, wherein the security graph is the representation in the security database; and traverse the security graph to find a second node representing the second workload.

9. The system of claim 8, wherein the memory contains further instructions which when executed by the processing circuitry further configure the system to:

detect a first code object in a configuration code file, the configuration code file including a plurality of code objects;

determine that the first workload is deployed based on the first code object; and apply the generated exception to the first code object.

10. The system of claim 8, wherein the memory contains further instructions that, when executed by the processing circuitry for generating the inspectable disk, further configure the system to:

clone the disk of the workload into a cloned disk.

11. The system of claim 8, wherein the memory contains further instructions which when executed by the processing circuitry further configure the system to release the inspectable disk in response to determining that inspection is complete.

12. The system of claim 8, wherein the memory contains further instructions which when executed by the processing circuitry further configure the system to:

detect a second cybersecurity object, the second cybersecurity object failing a policy of the first computing environment; and fail the first workload, in response to detecting the second cybersecurity object.

13. The system of claim 8, wherein the memory contains further instructions which when executed by the processing circuitry further configure the system to:

detect in the representation a representation of a first object, the first object deployed in the first computing environment;

detect in the representation a representation of a second object, the second object deployed in the second computing environment;

detect in the representation a connection between the representation of the first object and the representation of the second object; and apply a policy of the first computing environment to the first object and the second object in response to detecting the connection.

* * * * *